US012596996B2

(12) United States Patent
Bandodekar

(10) Patent No.: US 12,596,996 B2
(45) Date of Patent: Apr. 7, 2026

(54) SYSTEMS AND METHODS FOR PROVIDING DYNAMIC REPRESENTATION OF ASSETS IN A FACILITY

(71) Applicant: HONEYWELL INTERNATIONAL INC., Charlotte, NC (US)

(72) Inventor: Mandar Bandodekar, Galway (IE)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 299 days.

(21) Appl. No.: 18/215,831

(22) Filed: Jun. 29, 2023

(65) Prior Publication Data

US 2025/0005535 A1     Jan. 2, 2025

(51) Int. Cl.
*G06Q 30/00*      (2023.01)
*G06Q 10/20*      (2023.01)
(52) U.S. Cl.
CPC ..................................... *G06Q 10/20* (2013.01)
(58) Field of Classification Search
None
See application file for complete search history.

(56) References Cited

U.S. PATENT DOCUMENTS

2017/0248700 A1* 8/2017 Lodden ................. G01P 21/025
2020/0380336 A1* 12/2020 Chowdhury ........... G06N 3/044

2022/0335317 A1* 10/2022 Segner .................. G06N 20/00
2023/0129649 A1* 4/2023 Kalwani .............. G06T 15/005
                                                        345/419
2023/0394889 A1* 12/2023 Waagen .............. G07C 5/0816

OTHER PUBLICATIONS

SVG-Based Real-Time Monitoring System for Substation Equipment; Q. Junhua, X. Yang and Z. Qianyuan, 2013 Third International Conference on Instrumentation, Measurement, Computer, Communication and Control, Shenyang, China, 2013, pp. 564-568 (Year: 2013).*

* cited by examiner

*Primary Examiner* — Matthew T Sittner

(57)      ABSTRACT

Various embodiments described herein relate to systems and methods for providing dynamic representation of assets in a facility. In this regard, a first vector for an asset from amongst a plurality of assets in a facility is determined. The first vector is derived from one or more static parameters associated with the asset. Further, telemetry data from the asset is received in the facility. In this regard, telemetry data includes a plurality of readings from the asset at a plurality of timestamps and each reading from amongst the plurality of readings is received at a respective timestamp. A second vector for the asset at each of the plurality of timestamps is determined. The second vector includes a product of the first vector and a corresponding reading at the respective timestamp. The second vector at each of the plurality of timestamps is convoluted to obtain a dynamic representation of the asset. The dynamic representation of the asset is used to predict a maintenance requirement for the asset.

16 Claims, 20 Drawing Sheets

800

802 → Static Parameter 1 = [0.3, 0.5, 0.97, 0.1, 0.29, 0.4, 0.6,.....]

804 → Asset 1 = [0.2, 0.25, 0.17, 0.3, 0.9, 0.4, 0.124, 0.36,.....]

806 → Asset 2 = [0.12, 0.1, 0.0, 0.01, 0.229, 0.34, 0.64,.....]

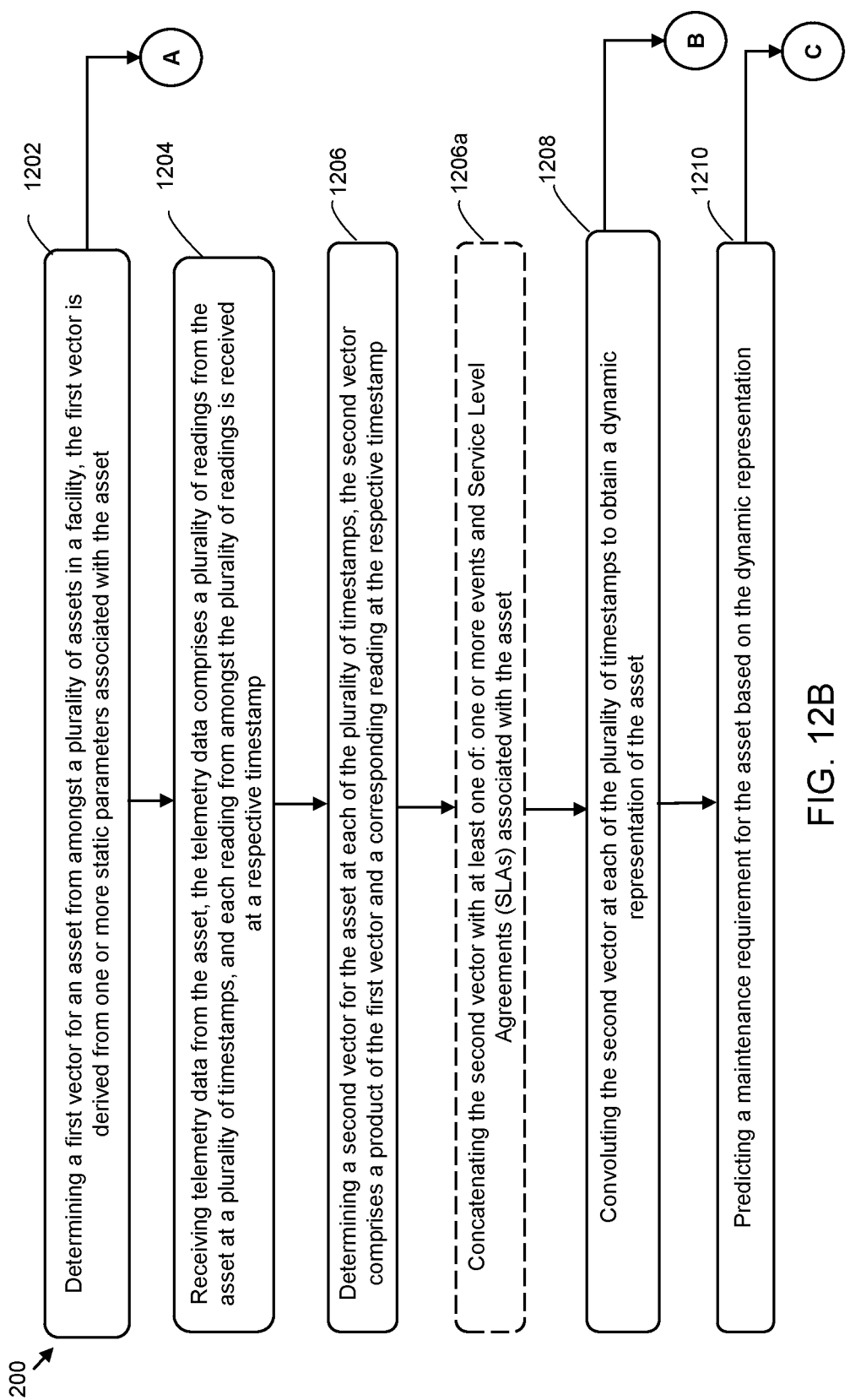

1200

1202 — Determining a first vector for an asset from amongst a plurality of assets in a facility, the first vector is derived from one or more static parameters associated with the asset

A

1204 — Receiving telemetry data from the asset, the telemetry data comprises a plurality of readings from the asset at a plurality of timestamps, and each reading from amongst the plurality of readings is received at a respective timestamp 1206 — Determining a second vector for the asset at each of the plurality of timestamps, the second vector comprises a product of the first vector and a corresponding reading at the respective timestamp 1206a — Concatenating the second vector with at least one of: one or more events and Service Level Agreements (SLAs) associated with the asset 1208 — Convoluting the second vector at each of the plurality of timestamps to obtain a dynamic representation of the asset

B

1210 — Predicting a maintenance requirement for the asset based on the dynamic representation

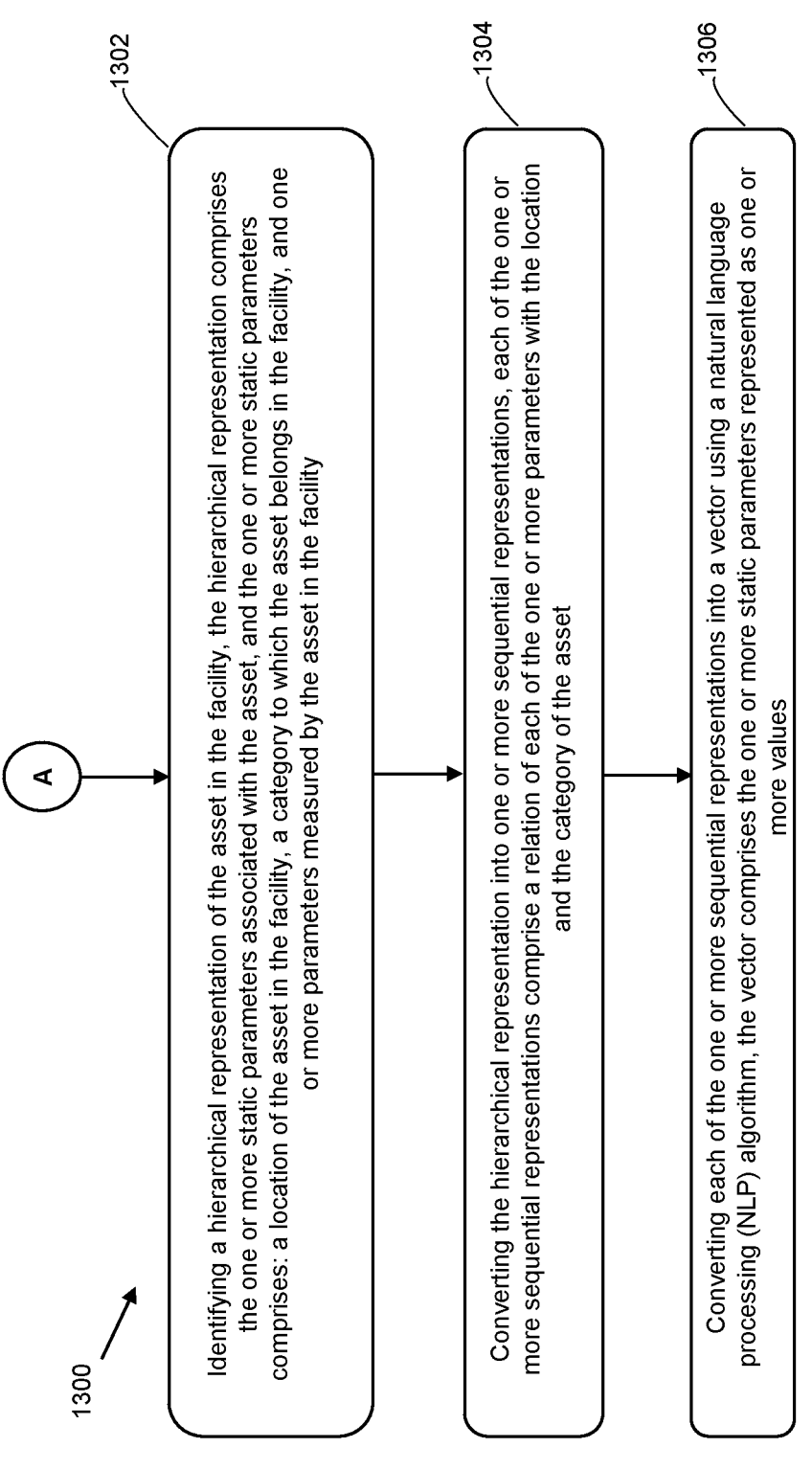

1300

1302

Identifying a hierarchical representation of the asset in the facility, the hierarchical representation comprises the one or more static parameters associated with the asset, and the one or more static parameters comprises: a location of the asset in the facility, a category to which the asset belongs in the facility, and one or more parameters measured by the asset in the facility

1304

Converting the hierarchical representation into one or more sequential representations, each of the one or more sequential representations comprise a relation of each of the one or more parameters with the location and the category of the asset

1306

Converting each of the one or more sequential representations into a vector using a natural language processing (NLP) algorithm, the vector comprises the one or more static parameters represented as one or more values

SYSTEMS AND METHODS FOR PROVIDING DYNAMIC REPRESENTATION OF ASSETS IN A FACILITY

TECHNICAL FIELD

The present disclosure generally relates to a facility management system. More particularly, the present disclosure relates to providing dynamic representation of assets in a facility.

BACKGROUND

Generally, a facility (e.g., a building facility, a warehouse, an industrial plant, and/or the like) includes numerous assets such as, for example, sensors, input/output modules, controllers, firewall devices, and/or the like. The assets are situated at various locations or spread across the facility. In this regard, links/relations can exist between these assets in the facility. For example, a conveyor located at a first location in the facility can be related to another conveyor located at a second location in the facility. Further, in some instances, a motor of a conveyor located at a shipping section of the facility can be related to another conveyor located at a picking section of the facility. In this regard, an issue associated with a motor of a conveyor located at a shipping section of the facility may impact another conveyor located at a picking section of the facility. Accordingly, analyzing these links/relations is vital as it helps in deriving several insights related to the assets. However, manual assessment of such links/relations by an experienced professional is cumbersome and error prone. This results in issues, such as faults, failures, or inefficiencies of assets going undetected, increased downtime, etc. Accordingly, it becomes challenging to manage assets and processes in the facility.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 12B illustrates a flowchart showing a method described in accordance with some example embodiments described herein.

FIG. 13 illustrates a flowchart showing a method described in accordance with some example embodiments described herein.

SUMMARY

Figure 1:
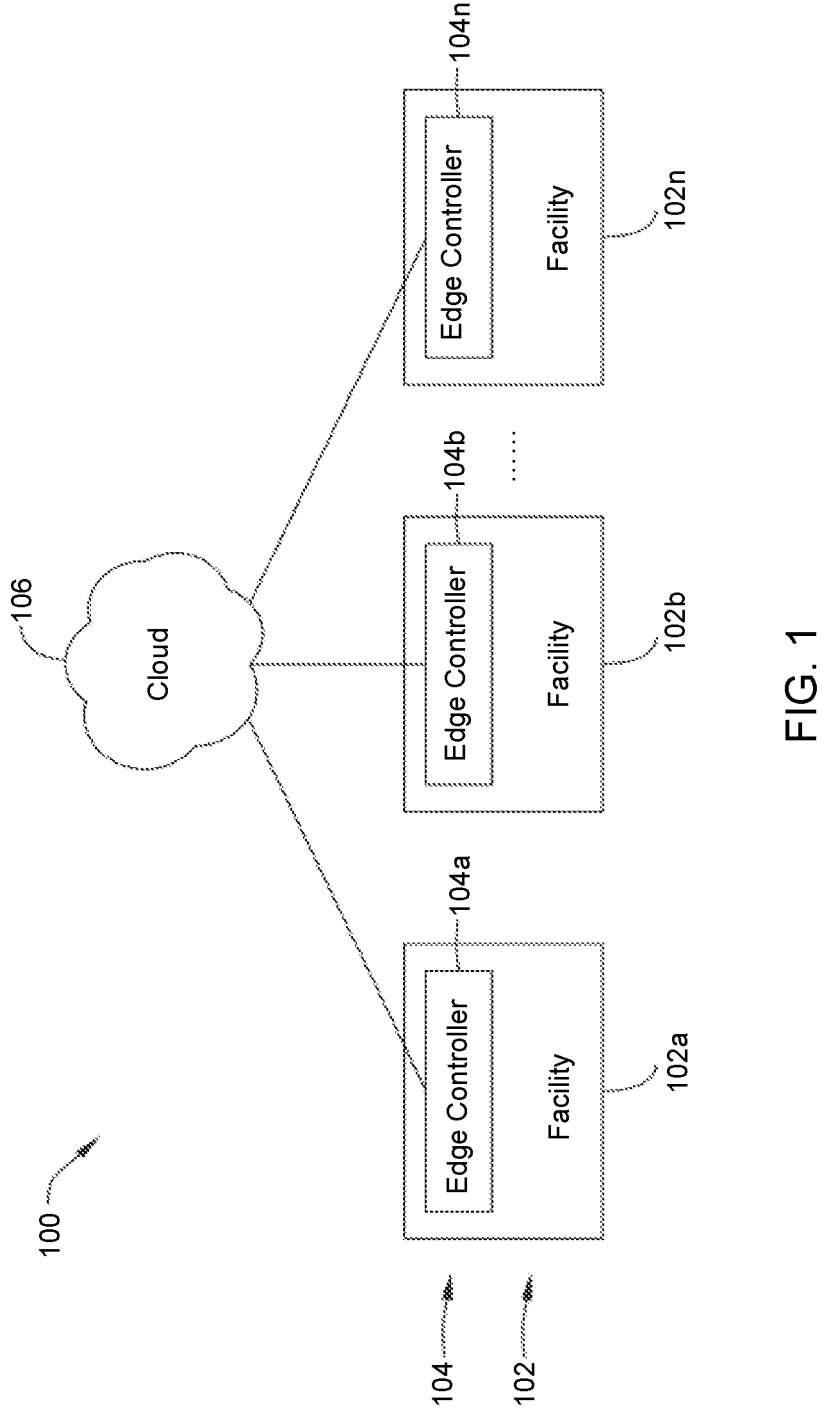
FIG. 1 illustrates a schematic diagram showing a facility management system comprising multiple facilities, in accordance with one or more example embodiments described herein.

The details of some embodiments of the subject matter described in this specification are set forth in the accompanying drawings and the description below. Other features, aspects, and advantages of the subject matter will become apparent from the description, the drawings, and the claims. In accordance with an example embodiment, a method is described. In one or more example embodiments, the method comprises determining a first vector for an asset from amongst a plurality of assets in a facility. In this regard, in some example embodiments, the first vector is derived from one or more static parameters associated with the asset. In one or more example embodiments, the method further comprises receiving telemetry data from the asset, wherein the telemetry data comprises a plurality of readings from the asset at a plurality of timestamps. In this regard, in some example embodiments, each reading from amongst the plurality of readings is received at a respective timestamp. In one or more example embodiments, the method further comprises determining a second vector for the asset at each of the plurality of timestamps. In some example embodiments, determining the second vector comprises a product of the first vector and a corresponding reading at the respective timestamp. In one or more example embodiments, the method further comprises convoluting the second vector at each of the plurality of timestamps to obtain a dynamic representation of the asset. In one or more example embodiments, the method further comprises predicting a maintenance requirement for the asset based on the dynamic representation.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained in the following description and its accompanying drawings.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

DETAILED DESCRIPTION OF THE DRAWINGS

Reference will now be made in detail to embodiments, examples of which are illustrated in the accompanying drawings. In the following detailed description, numerous specific details are set forth in order to provide a thorough understanding of the various described example embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one example embodiment of the present disclosure, and can be included in more than one example embodiment of the present disclosure (importantly, such phrases do not necessarily refer to the same example embodiment).

The word "exemplary" is used herein to mean "serving as an example, instance, or illustration." Any implementation described herein as "exemplary" is not necessarily to be construed as preferred or advantageous over other implementations. If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some example embodiments, or it can be excluded.

One or more example embodiments of the present disclosure may provide an "Internet-of-Things" or "IoT" platform for facility management that uses real-time accurate models and visual analytics to deliver dynamic representations of assets for sustained peak performance of the facility or the enterprise. The IoT platform is an extensible platform that is portable for deployment in any cloud or data center environment for providing an enterprise-wide, top to bottom view, displaying status of processes, assets, people, and/or safety. Further, the IoT platform of the present disclosure supports end-to-end capability to execute digital twins against process data to generate dynamic representations of assets in the facility or the enterprise, as detailed in the following description.

A facility (e.g., a building, an industrial site, a factory, a material handling system, a warehouse, and/or the like) includes numerous assets. The assets can be spread across numerous locations/parts within the facility according to a predefined structure. In this regard, the assets in the facility may be related to each other directly or indirectly. Manually figuring this relationship is tedious and cumbersome. Further, some characteristics like physical attributes of assets in the facility are static or constant in nature. This is relatable to a real time example of a human body. For example, in human body some of the features/characteristics like number of eyes, number of ears, reason for presence of eyes, and/or the like are static in nature. These features are fixed for human and is not subjected to changes with time. However, one or more characteristics like eye pressure, heartbeat, nerve response, blood pressure, air quality breathed by the human body is dynamic in nature. That is, these characteristics vary with respect to time. These dynamic characteristics are directly or indirectly relatable to the static parameters. Further, the dynamic characteristics and static characteristics can be used to build a model for the human body. Further, this model can be used to analyze a relationship between these characteristics and predict events associated with the human body. Similarly, this can be relatable to assets in a facility as well. That is, for example, a temperature sensor configured to sense/measure temperature can sense/measure temperature only. So, temperature serves as a static parameter for the temperature sensor. In another example, if a pump has an inlet valve and an outlet valve i.e., two valves, then this characteristic for the pump remains static. Whereas values/measurements sensed by the assets is dynamic in nature. For example, a reading from the temperature sensor varies with respect to time. That is, a reading at a first timestamp t1 may not be same as that of a reading at a tenth timestamp t10. However, the dynamic characteristic of an asset is currently not related to the static parameters/physical attributes of the asset. Accordingly, when the static parameters are related to dynamic characteristic(s) for an asset, several insights related to assets and facility in which the asset is located can be derived. Further, assets can be modelled based at least in part on static parameters and dynamic characteristics.

One or more example embodiments described herein generate a dynamic representation of one or more assets in a facility. The dynamic representation is generated based at least in part on the static parameters and dynamic characteristics. The dynamic representation generated herein models static parameters and dynamic characteristics in the form of one or more vectors. Further, the dynamic representation generated for an asset can be used to generate dynamic representation for other assets or hierarchy of assets or the entire facility as well. The generated dynamic representation can be used to analyze interrelationship between various assets situated in the facility. This helps to predict a maintenance requirement for one or more assets in the facility. For example, if there is a fault that is detected for one asset, then an impact on other asset in the facility can be predicted. This results in mitigating downtime and preventing impact of a problem associated with the assets to flow down to other related assets in the facility. On an overall, the dynamic representation generated herein improves overall throughput of the facility. In addition, the one or more exemplary systems described herein may use the dynamic representation to predict a remaining useful life of an asset, a fault level in an asset, an obsolescence associated with an asset, an unavailability of one or more spare parts of an asset, an impact on Service Level Agreements (SLAs) associated with an asset, and/or an impact on client commitments. Also, the one or more exemplary systems described herein may use the dynamic representation to modify a configuration of one or more assets in the facility.

FIG. 1 illustrates a schematic diagram showing a facility management system comprising multiple facilities. In various example embodiments, a facility management system 100 may be used to facilitate data handling and various operational activities for one or more facilities 102a, 102b, . . . 102n (collectively "facilities 102"). In some example embodiments, the one or more facilities 102a, 102b, . . . 102n may comprise a plurality of assets. In some example embodiments, the illustrative facility management system 100 may generate dynamic representation of assets. In some example embodiments, the illustrative facility management system 100 may use dynamic representation of assets to manage the one or more facilities 102a, 102b, . . . 102n. In some example embodiments, the illustrative facility management system 100 may use dynamic representation of assets to change configuration of asset settings in the one or more facilities 102a, 102b, . . . 102n. In some example embodiments, the illustrative facility management system 100 may use dynamic representation of assets to change operational set point of an asset in the one or more facilities 102a, 102b, . . . 102n. In another example, the illustrative facility management system 100 may use dynamic representation of assets to generate a service case for an asset in the one or more facilities 102a, 102b, . . . 102n. In another example, the illustrative facility management system 100 may use dynamic representation of assets to perform predictive maintenance of assets in the one or more facilities 102a, 102b, . . . 102n. In some example embodiments, the one or more facilities 102a, 102b, . . . 102n may represent a building or part of a building. In some example embodiments, the one or more facilities 102a, 102b, . . . 102n may represent an industrial process or part of an industrial process. In some example embodiments, the one or more facilities 102a, 102b, . . . 102n may represent similar types of facilities. In some example embodiments, the one or more facilities 102a, 102b, . . . 102n may represent different types of facilities e.g. a residential complex, a commercial building, an institutional building, a monument, an IT park, a corporate office, an airport premises, a tourist place etc. As may be understood, these facilities may include various electronic equipment, sensor system etc. (referred herein as assets and/or devices) for performing various operations within the facility. In some examples, these facilities may include thousands of sensor systems and its sub-systems which may operate in conjunction to run the operations of the facility premises. In this regard, these assets may perform several data transactions and exchange large data files in various formats amongst each other using plurality of data communication protocols.

In an example embodiment, a cloud 106 is operably coupled with one or more facilities 102a, 102b, . . . 102n, meaning that communication between the cloud 106 and one or more facilities 102a, 102b, . . . 102n is enabled. The cloud 106 may represent distributed computing resources, software, platform or infrastructure services which can enable data handling, data processing, data management, and/or analytical operations on the data exchanged & transacted amongst the various assets of the one or more facilities 102a, 102b, . . . 102n. In this regard, in accordance with some example embodiments, operational data such as telemetry data (e.g. sensor data) and optionally associated metadata (e.g. contextual information associated with sensor data) can be uploaded to the cloud 106 for processing. In some example embodiments, the operational data may be associated with assets situated in the one or more facilities 102a, 102b, . . . 102n. In some examples, the cloud 106 may receive and/or transact operational data (OT data) and information technology (IT) enabled data through the one or more facilities 102a, 102b, . . . 102n. In some examples, the OT data may represent telemetry data. Telemetry data can include time stamps and data values corresponding to those time stamps. In other words, telemetry data can represent data collected over a period of time (e.g. continuous data stream captured over a time period) from various assets (e.g. sensors, IoT network) of the facility. In this regard, in accordance with some example embodiments, dynamic representation of assets may be generated by the cloud 106 based on processing and modelling of operational data associated with an asset.

In an example embodiment, the cloud 106 includes one or more servers that may be programmed to communicate with the one or more facilities 102a, 102b, . . . 102n and to exchange data as appropriate. The cloud 106 may be a single computer server or may include a plurality of computer servers. In some example embodiments, the cloud 106 may represent a hierarchal arrangement of two or more computer servers, where perhaps a lower level computer server (or servers) processes telemetry data, for example, while a higher-level computer server oversees operation of the lower level computer server or servers.

The one or more facilities 102a, 102b, . . . 102n may include a variety of different assets. In an example embodiment, the one or more facilities 102a, 102b, . . . 102n may include a variety of different assets, at least some of which are of same type. In an example embodiment, the one or more facilities 102a, 102b, . . . 102n may include a variety of different assets, at least some of which are of different type. In the example shown in FIG. 1, each of the one or more facilities 102a, 102b, . . . 102n includes a respective edge controller 104a, 104b, . . . 104n (collectively "edge controllers 104"). In an example embodiment, each of one or more edge controllers 104a, 104b, . . . 104n is configured to receive data from a variety of assets within the one or more facilities 102a, 102b, . . . 102n. In some examples, the one or more edge controllers 104a, 104b, . . . 104n may operate as intermediary node to transact data through one or more assets of the facility and/or to the cloud 106. In some examples, each of the one or more edge controllers 104a, 104b, . . . 104n is capable of receiving the data from disparate data sources e.g., but not limited to, in different data formats and/or using various data communication protocols, from the plurality of assets of the facility. In this regard, each of the one or more edge controllers 104a, 104b, . . . 104n can receive & filter telemetry data and translate the telemetry data into a common language and/or format (e.g. normalized data) for subsequent communication to the cloud 106. The common language and/or format may be compatible with and expected by the cloud 106. In some example embodiments, the one or more edge controllers 104a, 104b, . . . 104n may be configured to generate dynamic representations of the one or more facilities 102a, 102b, . . . 102n based at least on the telemetry data.

Figure 2:
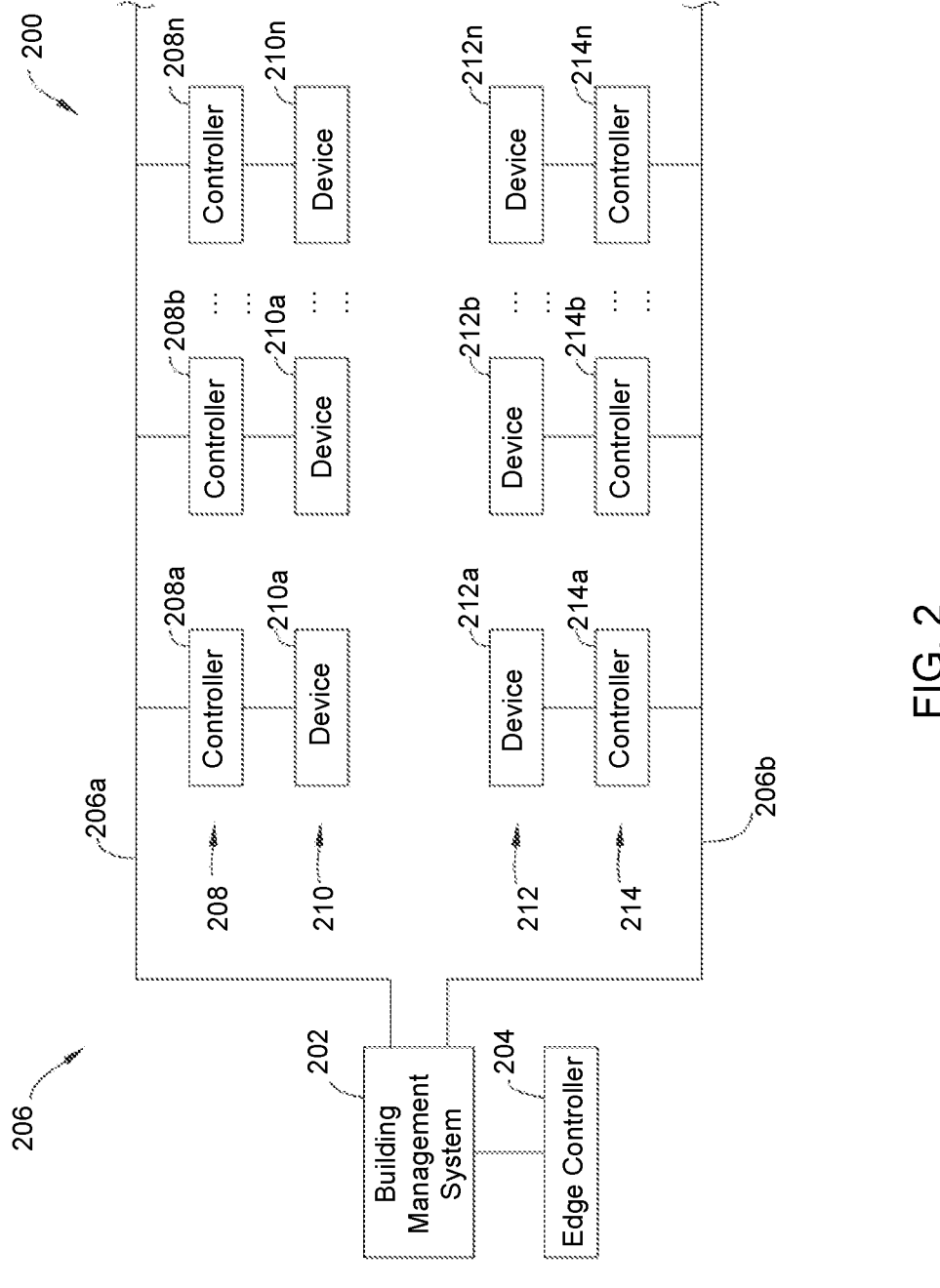
FIG. 2 illustrates a schematic diagram showing a facility management system, in accordance with one or more example embodiments described herein.

FIG. 2 illustrates a schematic diagram showing a facility management system. In various example embodiments, an example facility 200 of FIG. 2 may comprise assets communicatively coupled via multiple networks 206 (e.g. communication channels). For instance, as illustrated in FIG. 2, the facility 200 may include a first network 206a and a second network 206b. In an example embodiment, the facility 200 may include only a single network 206. In an example embodiment, the facility 200 may include multiple networks 206. Each of the networks 206 may include any available network infrastructure. In an example embodiment, each of the networks 206 may independently be, for example, a BACnet network, a NIAGARA network, a NIAGARA CLOUD network, or others. Accordingly, in some example embodiments, the facility 200 may comprise a plurality of assets and/or devices in communication with the building management system 202 via corresponding communication channel (e.g. networks 206a and/or 206b). Said differently, each of the network may represent a sub-network supported by an underlined network communication/IoT protocol and incorporating a cluster of end-points (e.g. assets, controllers etc. in building facility).

In an example embodiment, one or more first assets 210a, 210b, . . . 210n (collectively "first assets 210") are operably coupled to the first network 206a via one or more first controllers 208a, 208b, . . . 208n (collectively "first controllers 208"). The one or more first assets 210a, 210b, . . . 210n may represent a variety of different types of assets that may be found within the facility 200. In an example embodiment, at least some of the one or more first assets 210a, 210b, . . . 210n are building management system components. Examples of building management system components may be, but not limited to sensors, actuators, valves, etc. In another example embodiment, at least some of the one or more first assets 210a, 210b, . . . 210n are equipment within a factory. In another example embodiment, at least some of the one or more first assets 210a, 210b, . . . 210n are industrial process control devices within an industrial process. In some example embodiments, the one or more first assets 210a, 210b, . . . 210n may be arranged in an hierarchical manner in the facility 200.

In another example embodiment, the one or more first controllers 208a, 208b, . . . 208n controls operation of at least one of the one or more first assets 210a, 210b, . . . 210n. In some example embodiments, the one or more first controllers 208a, 208b, . . . 208n can transact telemetry data that can be processed and/or analyzed to generate dynamic representations for the one or more first assets 210a, 210b, . . . 210n. In some example embodiments, the dynamic representations may be used to generate one or more service cases for maintaining the one or more first assets 210a, 210b, . . . 210n. In some example embodiments, the dynamic representations may be used to configure the one or more first assets 210a, 210b, . . . 210n. In another example embodiment, the one or more first controllers 208a, 208b, . . . 208n may be built into one or more of the corresponding one or more first assets 210a, 210b, . . . 210n, and may not be a separate component. In another example embodiment, the one or more first controllers 208a, 208b, . . . 208n may be virtual controllers that may be implemented within a virtual environment hosted by one or more computing devices (not illustrated). The one or more first controllers 208a, 208b, . . . 208n may be containerized. In another example embodiment, at least some of the one or more first assets 210a, 210b, . . . 210n may be controllers. In such case, the one or more first assets 210a, 210b, . . . 210n may not have a separate corresponding controller of the one or more one or more first controllers 208a, 208b, . . . 208n.

In an example embodiment, one or more second assets 212a, 212b, . . . 212n (collectively "second assets 212"), are operably coupled to the second network 206b via one or more second controllers 214a, 214b, . . . 214n (collectively "second controllers 214"). The one or more second assets 212a, 212b, . . . 212n may represent any of a variety of different types of assets that may be found within the facility 200. In an example embodiment, at least some of the one or more second assets 212a, 212b, . . . 212n are building management system components. Examples of building management system components may be, but not limited to sensors, actuators, valves, etc. In another example embodiment, at least some of the one or more second assets 212a, 212b, . . . 212n are equipment within a factory. In another embodiment, at least some of the one or more second assets 212a, 212b, . . . 212n are industrial process control devices within an industrial process. In some example embodiments, the one or more second assets 212a, 212b, . . . 212n may be arranged in an hierarchical manner in the facility 200.

In another example embodiment, the one or more second controllers 214a, 214b, . . . 214n controls operation of at least one of the one or more second assets 212a, 212b, . . . 212n. In some example embodiments, the one or more second controllers 214a, 214b, . . . 214n can transact telemetry data that can be processed and/or analyzed to generate dynamic representations for the one or more second assets 212a, 212b, . . . 212n. In some example embodiments, the dynamic representations may be used to generate one or more service cases for maintaining the one or more second assets 212a, 212b, . . . 212n. In some example embodiments, the dynamic representations may be used to configure the one or more second assets 212a, 212b, . . . 212n. In another example embodiment, the one or more second controllers 214a, 214b, . . . 214n may be built into one or more of the corresponding one or more second assets 212a, 212b, . . . 212n, and may not be a separate component. In another example embodiment, the one or more second controllers 214a, 214b, . . . 214n may be virtual controllers that may be implemented within a virtual environment hosted by one or more computing devices (not illustrated). The one or more second controllers 214a, 214b, . . . 214n may be containerized. In another example embodiment, at least some of the one or more second assets 212a, 212b, . . . 212n may be controllers. In such case, the one or more second assets 212a, 212b, . . . 212n may not have a separate corresponding controller of the one or more one or more second controllers 214a, 214b, . . . 214n.

In an example embodiment, the facility 200 may include a facility management system 202 that is operably coupled with the first network 206a and the second network 206b. In another example embodiment, the facility management system 202 may be operably coupled with the first network 206a but not with the second network 206b. In another example embodiment, the facility management system 202 may be operably coupled with the second network 206b but not with the first network 206a. In an example embodiment, the facility management system 202 may be a legacy controller. In another example embodiment, the facility management system 202 may be absent.

In an example embodiment, an edge controller 204 is installed within the facility 200. In some example embodiments, the edge controller 204 may be operably coupled with the facility management system 202. The edge controller 204 may be considered as functioning as an intermediary between the first controllers 208, the second controllers 214, and the cloud 106. For instance, in an example, the edge controller 204 can pull data from the first controllers 208 and the second controllers 214 and provide the data to the cloud 106. In an example embodiment, the edge controller 204 is configured to discover the first assets 210, the second assets 212, the first controllers 208, and/or the second controllers 214 that are connected along a local network such as the network 206. In an example embodiment, the network protocol of the network 206 includes discovery commands that, for example, are used to request that all devices connected to the network 206 identify themselves. In some cases, the edge controller 204 is configured to discover the first assets 210 and the second assets 212 regardless of an underlaying protocol supported by the first assets 210 and the second assets 212. In other words, the edge controller 204 can discover the first assets 210 and the second assets 212 supported by different protocols (e.g. BACnet, Modbus, LonWorks, SNMP, MQTT, Foxs, OPC UA etc.).

In an example embodiment, the edge controller 204 interrogates any devices it finds operably coupled to the network 206 to obtain additional information from those devices that further helps the edge controller 204 and/or the cloud 106 identify the connected devices, such as type of building system components, functionality of the identified building system components, connectivity of the local controllers and/or building system components, types of operational data that is available from the local controllers and/or building system components, types of alarms that are available from the local controllers and/or building system components, and/or any other suitable information. In some example embodiments, the edge controller 204 and/or the cloud 106 can also create a hierarchical representation or structure upon identifying the connected devices. Further, in some example embodiments, the edge controller 204 and/or the cloud 106 can identify static parameters associated with each of the connected devices. In this regard, the edge controller 204 and/or the cloud 106 can generate a set of first vectors (alternatively "static vectors") based on the static parameters associated with each of the connected devices. For purpose of brevity, the additional information requested from the devices is referred interchangeably as, 'metadata', 'semantic data', or 'the model data', hereinafter throughout the description.

More generally, and in some example embodiments, the edge controller 204 may be communicatively coupled to one or more assets, via one or more networks. For purpose of brevity, the term 'assets' is also referred interchangeably to as 'data points', 'end points', 'devices', 'sensors', or 'electronic devices' throughout the description. According to various example embodiments described herein, the assets can be, for example, but not limited to, sensors, electronic components, pressure valves, HVACs, alarm units, building management systems, building controllers, industrial sub-systems, industrial controllers, lightning systems, air detective systems, air quality sensors, etc. These may correspond to, for example, one or more of the first assets 210 and the second assets 212.

According to an example embodiment, the edge controller 204 is configured to receive at least one of, the telemetry data and model data from the one or more assets corresponding to various independent and diverse sub-systems in the facility 200 (e.g., but not limited to, a building, an industrial site, a warehouse, etc.). The one or more assets correspond to various independent and diverse sub-systems in the facility 200. In some examples, the telemetry data can represent time-series data and may include a plurality of data values associated with the assets which can be collected over a period of time. For instance, in an example, the telemetry data may represent a plurality of sensor readings collected by a sensor over a period of time. Further, the model data can represent meta-data associated with the assets. The model data can be indicative of ancillary or contextual information associated with the asset. For instance, in an example, the model data can be representative of geographical information associated with the asset (e.g. location of the asset) within the facility 200. In another example, the model data can represent a sensor setting based on which a sensor is commissioned within a facility 200. In yet another example, the model data can be representative of a data type or a data format associated with the data transacted through the asset. In yet another example, the model data can be indicative of any information which can define a relationship of the asset with one or more other assets in the facility 200. In some example embodiments, the model data can be indicative of hierarchical representation of assets in the facility. In some example embodiments, the model data can be indicative of static vectors generated for assets in the facility. In some example embodiments, the model data can be indicative of dynamic representation of assets in the facility. In accordance with various example embodiments described herein, the term 'model data' can be referred interchangeably as 'semantic model' or 'metadata' for purpose of brevity.

In accordance with an example embodiment, the edge controller 204 is configured to discover and identify the one or more assets which are communicatively coupled to the edge controller 204. Further, upon identification of the assets, the example edge controller 204 is configured to pull the telemetry data and/or the model data from the various identified assets. In an example, these assets can correspond to one or more electronic devices that may be located on-premises in the facility 200. The edge controller 204 is configured to pull the data by sending one or more data interrogation requests to the one or more assets. These data interrogation requests can be based on a protocol supported by an underlying one or more assets.

In accordance with an example embodiment, the edge controller 204 is configured to receive the telemetry data and/or the model data in various data formats or different data structures. In an example, a format of the telemetry data and/or the model data, received at the edge controller 204 may be in accordance with a communication protocol of the network supporting transaction of data amongst two or more network nodes (i.e. the edge controller 204 and the asset). As can be appreciated, in some example embodiments, the various assets in the facility 200 can be supported by one or more of various network protocols (e.g., IOT protocols like BACnet, Modbus, LonWorks, SNMP, MQTT, Foxs, OPC UA etc.). Accordingly, and in some cases, the edge controller 204 is configured to pull the telemetry data and/or the model data, in accordance with communication protocol supported by the one or more assets.

In some example embodiments, the edge controller 204 is configured to process the received data and transform the model data into a unified data format. The unified data format is referred hereinafter as a common object model. In an example, the common object model is in accordance with an object model that may be required by one or more data analytics applications or services, supported at the cloud 106. In some example embodiments, the edge controller 204 can perform data normalization to normalize the received data into a pre-defined data format. In an example, the pre-defined format can represent a common object model in which the edge controller 204 can further push the telemetry data and/or the model data to the cloud 106. In some example embodiments, the edge controller 204 and/or the cloud 106 can generate dynamic representation of assets using a common object model. In some example embodiments, the edge controller 204 is configured to establish a secure communication channel with the cloud 106. In this regard, the data can be transacted between the edge controller 204 and the cloud 106, via the secure communication channel. In some example embodiments, the edge controller 204 can send the data to the cloud 106 automatically at pre-defined time intervals. In some example embodiments, at least a part of the data can correspond to historic data. In some example embodiments, the edge controller 204 and/or the cloud 106 can update the dynamic representation of assets in near-real time based on the data transacted between the edge controller 204 and the cloud 106.

In some example embodiments, the edge controller 204 and/or the cloud 106 can identify one or more events in the facility 200 based on the dynamic representation of assets. In some example embodiments, the edge controller 204 and/or the cloud 106 can predict one or more events in the facility 200 based on the dynamic representation of assets. In some example embodiments, the one or more events may be associated with the one or more first assets 210a, 210b, . . . 210n or the one or more second assets 212a, 212b, . . . 212n in the facility 200. In some example embodiments, the one or more events may be associated with one or more processes in the facility 200. In some example embodiments, an event may be a black swan event in the facility. In some example embodiments, an event may be related to a natural calamity such as cyclone, flood, and/or the like. In some example embodiments, an event may be an accident in/around the facility. In some example embodiments, an event may be associated with lack of infrastructural amenities in/near the facility. In this regard, in some exemplary embodiments, an event may affect normal operations in the facility. In some example embodiments, the edge controller 204 and/or the cloud 106 can utilize the one or more events to assess overall performance of assets and/or the facility. Accordingly, in this regard, in some example embodiments, the edge controller 204 and/or the cloud 106 can predict a maintenance requirement in the facility in order to facilitate normal operations in the facility.

Figure 3:
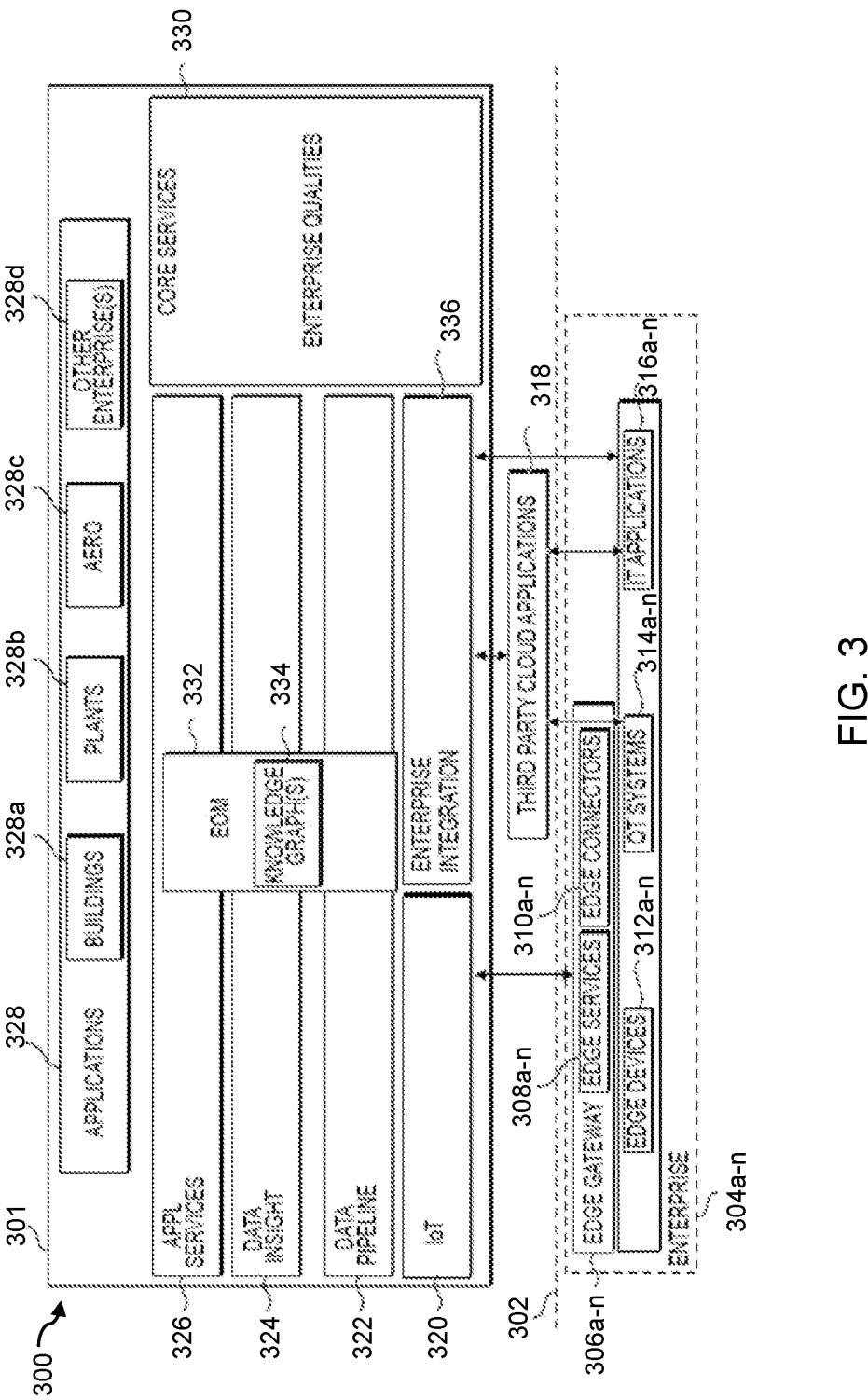
FIG. 3 illustrates a schematic diagram showing a framework of an Internet-of-Things (IoT) platform utilized in a facility management system, in accordance with one or more example embodiments described herein.

FIG. 3 illustrates a schematic block diagram of framework 300 of an IoT platform 301, according to the present disclosure. The IoT platform 301 of the present disclosure is a platform for facility management that uses real-time accurate models and/or visual analytics to deliver dynamic representation of assets for sustained peak performance of a facility or an enterprise 304a-304n. The IoT platform 301 is an extensible platform that is portable for deployment in any cloud or data center environment for providing an enterprise-wide, top to bottom view, displaying the status of processes, assets, people, and safety. Further, the IoT platform 301 supports end-to-end capability to execute digital twins against process data and to generate dynamic representation of assets, using the framework 300, detailed further below.

As shown in FIG. 3, the framework 300 of the IoT platform 301 comprises a number of layers including, for example, an IoT layer 320, an enterprise integration layer 336, a data pipeline layer 322, a data insight layer 324, an application services layer 326, and an applications layer 328. The IoT platform 301 also includes a core services layer 330 and an extensible object model (EOM) 332 comprising one or more knowledge graphs 334. The layers 320-330 further include various software components that together form each layer 320-330. For example, in one or more embodiments, each layer 320-330 includes one or more of the modules, models, engines, databases, services, applications, or combinations thereof. In some embodiments, the layers 320-330 are combined to form fewer layers. In some embodiments, some of the layers 320-330 are separated into separate, more numerous layers. In some embodiments, some of the layers 320-330 are removed while others may be added.

The IoT platform 301 is a model-driven architecture. Thus, in certain embodiments, the extensible object model (EOM) 332 communicates with each layer 320-330 to contextualize site data of the enterprise 304a-304n using an extensible object model (or "asset model") and knowledge graphs 334 where the one or more assets (e.g., edge devices 312a-312n) and processes of the facility or the enterprise 304a-304n are modeled. In an example embodiment, the edge devices 312a-312n may be one of the one or more assets as illustrated in FIGS. 1 and 2. The knowledge graphs 334 of EOM 332 are configured to store the models in a central location. The knowledge graphs 334 define a collection of nodes and links that describe real-world connections that enable smart systems. As used herein, a knowledge graph 334: (i) describes real-world entities (e.g., edge devices 312a-312n) and their interrelations organized in a graphical interface; (ii) defines possible classes and relations of entities in a schema; (iii) enables interrelating arbitrary entities with each other; and (iv) covers various topical domains. In other words, the knowledge graphs 334 define large networks of entities (e.g., edge devices 312a-312n), semantic types of the entities, properties of the entities, and relationships between the entities. Thus, the knowledge graphs 334 describe a network of "things" that are relevant to a specific domain, an enterprise, or a facility. Knowledge graphs 334 are not limited to abstract concepts and relations, but can also contain instances of objects, such as, for example, documents and datasets. In some example embodiments, the knowledge graphs 334 include resource description framework (RDF) graphs. As used herein, a "RDF graph" is a graph data model that formally describes the semantics, or meaning, of information. The RDF graph also represents metadata (e.g., data that describes data). In some example embodiments, the knowledge graphs 334 may comprise relation between dynamic representations of the plurality of assets in the facility as described in exemplary embodiments associated with FIGS. 1 and 2. In some example embodiments, the relation between the dynamic representations may be represented in the knowledge graphs 334 using hierarchical relationship between the assets in the facility. In some example embodiments, the knowledge graphs 334 may be used by the facility management system to perform predictive maintenance of assets. In some example embodiments, the knowledge graphs 334 may also include one or more service cases that are generated in accordance with the predictive maintenance of assets. According to various example embodiments, the knowledge graphs 334 also include a semantic object model. The semantic object model is a subset of a knowledge graph 334 that defines semantics for the knowledge graph 334. For example, the semantic object model defines the schema for the knowledge graph 334.

As used herein, EOM 332 is a collection of application programming interfaces (APIs) that enables seeded semantic object models to be extended. For example, the EOM 332 of the present disclosure enables a customer's knowledge graph 334 to be built subject to constraints expressed in the customer's semantic object model. Thus, the knowledge graphs 334 are generated by customers (e.g., enterprises or organizations) to create models of the edge devices 312a-312n of an enterprise 304a-304n, and the knowledge graphs 334 are input into the EOM 332 for visualizing the models (e.g., the nodes and links). In some example embodiments, knowledge graphs 334 are input into the EOM 332 for visualizing dynamic representation of assets in the facility.

The models describe the assets (e.g., the nodes) of an enterprise (e.g., the edge devices 312a-312n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 312a-312n) and the type of data that is being sensed by each sensor. According to various embodiments, a key performance indicator (KPI) framework is used to bind properties of the assets in the extensible object model 332 to inputs of the KPI framework. Accordingly, the IoT platform 301 is an extensible, model-driven end-to-end stack including: two-way model sync and secure data exchange between the edge and the cloud, metadata driven data processing (e.g., rules, calculations, and aggregations), and model driven visualizations and applications. As used herein, "extensible" refers to the ability to extend a data model to include new dynamic representations, new service cases, new rules, new properties, new columns, new fields, new classes, new tables, and new relations. In some example embodiments, the knowledge graphs 334 may be updated to include new dynamic representations. Thus, the IoT platform 301 is extensible with regards to edge devices 312a-312n and the applications that handle those devices 312a-312n. For example, when new edge devices 312a-312n are added to an enterprise 304a-304n system, the new devices 312a-312n will automatically appear in the IoT platform 301. Accordingly, the IoT platform 301 has the capability to generate dynamic representations for the new devices 312a-312n in near-real time. With this, the corresponding applications 328 can understand and use the data from the new devices 312a-312n to manage the new devices and/or processes in the facility or the enterprise 304a-304n thereby increasing overall throughput of the facility.

In some cases, asset templates are used to facilitate configuration of instances of edge devices 312a-312n in the model using common structures. An asset template defines the typical properties or parameters for the edge devices 312a-312n of a given facility or enterprise 304a-304n for a certain type of device or asset. In this regard, some of the typical properties are static in nature. For example, an asset template of a pump includes modeling the pump having inlet and outlet pressures, speed, flow, etc. In other words, these properties such as pressure, speed, flow etc., for which the pump is configured to measure or sense is static. However, values or measurements sensed by the pump in real-time for the corresponding properties are dynamic in nature. The templates may also include hierarchical or derived types of edge devices 312a-312n to accommodate variations of a base type of device 312a-312n. For example, a reciprocating pump is a specialization of a base pump type and would include additional properties in the template. Instances of the edge device 312a-312n in the model are configured to match the actual, physical devices of the enterprise 304a-304n using the templates to define expected attributes of the device 312a-312n. Each attribute is configured either as a static value (e.g., capacity is 1000 BPH) or with a reference to a time series tag that provides the value. The knowledge graph 334 can automatically map the tag to the attribute based on naming conventions, parsing, and matching the tag and attribute descriptions and/or by comparing the behavior of the time series data with expected behavior. In some example embodiments, the knowledge graph 334 is configured to utilize the asset template to define static vectors for device 312a-312n. Further, the knowledge graph 334 is configured to generate dynamic representation of assets based at least in part on the asset template and static vectors. In some example embodiments, the knowledge graph 334 is configured to utilize the asset template to determine the one or more service cases to address the one or more events in the enterprise 304a-304n.

In certain example embodiments, the modeling phase includes an onboarding process for syncing the models between the edge and the cloud. In some example embodiments, the modeling phase can also include construction of the knowledge graph 334 using the dynamic representation of assets. For example, in one or more example embodiments, the onboarding process includes a simple onboarding process, a complex onboarding process, and/or a standardized rollout process. The simple onboarding process includes the knowledge graph 334 receiving raw model data from the edge and running context discovery algorithms to generate the model. The context discovery algorithms read the context of the edge naming conventions of the edge devices 312a-312n and determine what the naming conventions refer to. For example, in one or more example embodiments, the knowledge graph 334 receives "TMP" during the modeling phase and determines that "TMP" relates to "temperature" and corresponds to a static property. Further, these static properties are used to generate the static vectors. The generated models and vectors are then published. In certain example embodiments, the complex onboarding process includes the knowledge graph 334 receiving the raw model data, receiving point history data, and receiving site survey data. According to various example embodiments, the knowledge graph 334 then uses these inputs to run the context discovery algorithms. According to various example embodiments, the generated models are edited and then the models are published. The standardized rollout process includes manually defining standard models in the cloud and pushing the models to the edge.

The IoT layer 320 includes one or more components for device management, data ingest, and/or command/control of the edge devices 312a-312n. The components of the IoT layer 320 enable data to be ingested into, or otherwise received at, the IoT platform 301 from a variety of sources. For example, in one or more example embodiments, data is ingested from the edge devices 312a-312n through process historians or laboratory information management systems. The IoT layer 320 is in communication with the edge connectors 310a-310n installed on the edge gateways 306a-306n through network 302, and the edge connectors 310a-310n send the data securely to the IoT platform 301. In some example embodiments, only authorized data is sent to the IoT platform 301, and the IoT platform 301 only accepts data from authorized edge gateways 306a-306n and/or edge devices 312a-312n. According to various example embodiments, data is sent from the edge gateways 306a-306n to the IoT platform 301 via direct streaming and/or via batch delivery. Further, after any network or system outage, data transfer will resume once communication is re-established and any data missed during the outage will be backfilled from the source system or from a cache of the IoT platform 301. According to various example embodiments, the IoT layer 320 also includes components for accessing time series, alarms and events, and transactional data via a variety of protocols.

The enterprise integration layer 336 includes one or more components for events/messaging, file upload, and/or REST/OData. The components of the enterprise integration layer 336 enable the IoT platform 301 to communicate with third party cloud applications 318, such as any application(s) operated by an enterprise in relation to its edge devices. For example, the enterprise integration layer 336 connects with enterprise databases, such as guest databases, customer databases, financial databases, patient databases, etc. The enterprise integration layer 336 provides a standard application programming interface (API) to third parties for accessing the IoT platform 301. The enterprise integration layer 336 also enables the IoT platform 301 to communicate with the OT systems 314a-314n and IT applications 316a-316n of the enterprise 304a-304n. Thus, the enterprise integration layer 336 enables the IoT platform 301 to receive data from the third-party applications 318 rather than, or in combination with, receiving the data from the edge devices 312a-312n directly. In some example embodiments, the enterprise integration layer 336 also enables the IoT platform 301 to receive a feedback from one or more users related to the dynamic representation of assets in the facility.

The data pipeline layer 322 includes one or more components for data cleansing/enriching, data transformation, data calculations/aggregations, and/or API for data streams. Accordingly, in one or more example embodiments, the data pipeline layer 322 pre-processes and/or performs initial analytics on the received data. The data pipeline layer 322 executes advanced data cleansing routines including, for example, data correction, mass balance reconciliation, data conditioning, component balancing and simulation to ensure the desired information is used as a basis for further processing. The data pipeline layer 322 also provides advanced and fast computation capabilities. In some example embodiments, the data pipeline layer 322 can process the feedback to identify new dynamic representations, new service cases, new tags, new properties, new columns, new fields, new classes, new tables, and new relations, etc. For example, in one or more example embodiments, cleansed data is run through enterprise-specific digital twins. According to various example embodiments, the enterprise-specific digital twins include a reliability advisor containing process models to determine the current operation and the fault models to trigger any early detection and determine an appropriate resolution. According to various example embodiments, the digital twins also include an optimization advisor that integrates real-time economic data with real-time process data, selects the right feed for a process, and determines optimal process conditions and product yields.

According to various example embodiments, the data pipeline layer 322 employs models and templates to define calculations and analytics. Additionally or alternatively, according to various example embodiments, the data pipeline layer 322 employs models and templates to define how the calculations and analytics relate to the one or more assets (e.g., the edge devices 312a-312n). In some example embodiments, the data pipeline layer 322 also employs dynamic representation of assets to perform predictive maintenance of assets. In some example embodiments, the data pipeline layer 322 can then identify one or more events in the enterprise 304a-304n. For example, in an example embodiment, a fan template defines fan efficiency calculations such that every time a fan is configured, the standard efficiency calculation is automatically executed for the fan. The calculation model defines the various types of calculations, the type of engine that should run the calculations, the input and output parameters, the preprocessing requirement and prerequisites, the schedule, etc. According to various example embodiments, the actual calculation or analytic logic is defined in the template or it may be referenced. Thus, according to various example embodiments, the calculation model is employed to describe and control the execution of a variety of different process models. According to various example embodiments, calculation templates are linked with the asset templates such that when an asset (e.g., edge device 312a-312n) instance is created, any associated calculation instances are also created with their input and output parameters linked to the appropriate attributes of the asset (e.g., edge device 312a-312n). According to various example embodiments, the data pipeline layer 322 can identify one or more service cases based on the prediction of maintenance requirement for the asset/edge device 312a-312n in the enterprise 304a-304n.

According to various example embodiments, the IoT platform 301 supports a variety of different analytics models including, for example, curve fitting models, regression analysis models, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 304a-304n performance to identify issues or opportunities, and the potential causes or drivers of the issues or opportunities. The IoT platform 301 includes rich hierarchical symptom-fault models to identify abnormal conditions and their potential consequences. For example, in one or more embodiments, the IoT platform 301 drill downs from a high-level condition to understand the contributing factors, as well as determining the potential impact a lower level condition may have. There may be multiple fault models for a given enterprise 304a-304n looking at different aspects such as process, equipment, control, and/or operations. According to various example embodiments, each fault model identifies issues and opportunities in their domain, and can also look at the same core problem from a different perspective. According to various example embodiments, an overall fault model is layered on top to synthesize the different perspectives from each fault model into an overall assessment of the situation and point to the true root cause.

According to various example embodiments, when a fault or opportunity is identified, the IoT platform 301 provides one or more corrective actions and/or recommendations to be taken in the facility. Initially, the corrective actions and/or recommendations are based on expert knowledge that has been pre-programmed into the system by process and equipment experts. A recommendation services module presents this information in a consistent way regardless of source, and supports workflows to track, close out, and document the recommendation follow-up. According to various example embodiments, the recommendation follow-up is employed to improve the overall knowledge of the system over time as existing recommendations are validated (or not) or new cause and effect relationships are learned by users and/or analytics.

According to various example embodiments, the models and/or the dynamic representation of assets are used to accurately predict what will occur before it occurs and interpret the status of the installed base. Thus, the IoT platform 301 enables operators to quickly initiate maintenance measures when irregularities occur. In some example embodiments, the one or more recommendations can be created to address the irregularities in the enterprise 304a-304n. According to various example embodiments, the digital twin architecture of the IoT platform 301 employs a variety of modeling techniques. According to various example embodiments, the modeling techniques include, for example, rigorous models, fault detection and diagnostics (FDD), descriptive models, predictive maintenance, prescriptive maintenance, process optimization, and/or any other modeling technique.

According to various example embodiments, the rigorous models are converted from process design simulation. In this manner, in certain example embodiments, process design is integrated with feed conditions. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various example embodiments, the descriptive models identifies a problem and the predictive models determines possible damage levels and maintenance options. According to various example embodiments, the descriptive models include models for defining the operating windows for the edge devices 312a-312n.

Predictive maintenance includes predictive analytics models developed based on rigorous models and statistic models, such as, for example, principal component analysis (PCA) and partial least square (PLS). According to various example embodiments, machine learning methods are applied to train models for fault prediction. According to various example embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various example embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 324 includes one or more components for time series databases (TDSB), relational/document databases, data lakes, blob, files, images, and videos, and/or an API for data query. According to various example embodiments, when raw data is received at the IoT platform 301, the raw data is stored as time series tags or events in warm storage (e.g., in a TSDB) to support interactive queries and to cold storage for archive purposes. According to various example embodiments, data is sent to the data lakes for offline analytics development. According to various example embodiments, the data pipeline layer 322 accesses the data stored in the databases of the data insight layer 324 to perform analytics, as detailed above.

The application services layer 326 includes one or more components for rules engines, workflow/notifications, KPI framework, insights (e.g., actionable insights), decisions, recommendations, machine learning, and/or an API for application services. The application services layer 326 enables building of applications 328a-d. The applications layer 328 includes one or more applications 328a-d of the IoT platform 301. For example, according to various example embodiments, the applications 328a-d includes a buildings application 328a, a plants application 328b, an aero application 328c, and other enterprise applications 328d. According to various example embodiments, the applications 328 includes general applications for portfolio management, asset management, autonomous control, and/or any other custom applications. According to various example embodiments, portfolio management includes the KPI framework and a flexible user interface (UI) builder. According to various example embodiments, asset management includes asset performance, asset health, and/or asset predictive maintenance. According to various example embodiments, autonomous control includes energy optimization and/or predictive maintenance. As detailed above, according to various example embodiments, the general applications 328a-d is extensible such that each application 328a-d is configurable for the different types of enterprises 304a-304n (e.g., buildings application 328a, plants application 328b, aero application 328c, and other enterprise applications 328d).

The applications layer 328 also enables visualization of performance of the enterprise 304a-304n. For example, dashboards provide a high-level overview with drill downs to support deeper investigations. In one or more example embodiments, the dashboards provide one or more service cases to address the one or more events in the enterprise 304a-304n. Recommendation summaries give users prioritized actions to address current or potential issues and opportunities. Data analysis tools support ad hoc data exploration to assist in troubleshooting and process improvement. In one or more example embodiments, the dashboards may represent a ranking of one or more users or worker.

The core services layer 330 includes one or more services of the IoT platform 301. According to various example embodiments, the core services 330 include data visualization, data analytics tools, security, scaling, and monitoring. According to various example embodiments, the core services 330 also include services for tenant provisioning, single login/common portal, self-service admin, UI library/UI tiles, identity/access/entitlements, logging/monitoring, usage metering, API gateway/dev portal, and the IoT platform 301 streams.

Figure 4:
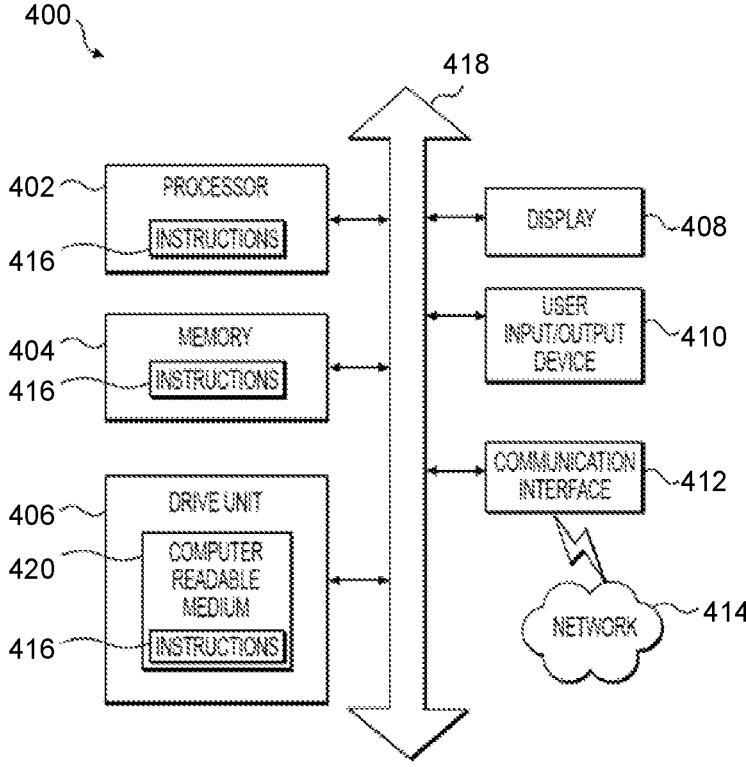
FIG. 4 illustrates a schematic diagram showing an implementation of a controller that may execute techniques in accordance with one or more example embodiments described herein.

FIG. 4 depicts an implementation of a controller 400 that may execute techniques presented herein, according to one or more example embodiments. The controller 400 may include a set of instructions that can be executed to cause the controller 400 to perform any one or more of the methods or computer based functions disclosed herein. The controller 400 may operate as a standalone device or may be connected, e.g., using a network, to other computer systems or peripheral devices.

In a networked deployment, the controller 400 may operate in the capacity of a server or as a client in a server-client user network environment, or as a peer computer system in a peer-to-peer (or distributed) network environment. The controller 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 400 can be implemented using electronic devices that provide voice, video, or data communication. Further, while the controller 400 is illustrated as a single system, the term "system" shall also be taken to include any collection of systems or sub-systems that individually or jointly execute a set, or multiple sets, of instructions to perform one or more computer functions.

As illustrated in FIG. 4, the controller 400 may include a processor 402, e.g., a central processing unit (CPU), a graphics processing unit (GPU), or both. The processor 402 may be a component in a variety of systems. For example, the processor 402 may be part of a standard computer. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The controller 400 may include a memory 404 that can communicate via a bus 418. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 404 includes a cache or random-access memory for the processor 402. In alternative implementations, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the processor 402 executing the instructions stored in the memory 404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 400 may further include a display 408, such as a liquid crystal display (LCD), an organic light emitting diode (OLED), a flat panel display, a solid-state display, a cathode ray tube (CRT), a projector, a printer or other now known or later developed display device for outputting determined information. The display 408 may act as an interface for the user to see the functioning of the processor 402, or specifically as an interface with the software stored in the memory 404 or in the drive unit 406.

Additionally or alternatively, the controller 400 may include an input/output device 410 configured to allow a user to interact with any of the components of controller 400. The input/output device 410 may be a number pad, a keyboard, or a cursor control device, such as a mouse, or a joystick, touch screen display, remote control, or any other device operative to interact with the controller 400.

The controller 400 may also or alternatively include drive unit 406 implemented as a disk or optical drive. The drive unit 406 may include a computer-readable medium 420 in which one or more sets of instructions 416, e.g. software, can be embedded. Further, the instructions 416 may embody one or more of the methods or logic as described herein. The instructions 416 may reside completely or partially within the memory 404 and/or within the processor 402 during execution by the controller 400. The memory 404 and the processor 402 also may include computer-readable media as discussed above.

In some systems, a computer-readable medium 420 includes instructions 416 or receives and executes instructions 416 responsive to a propagated signal so that a device connected to a network 414 can communicate voice, video, audio, images, or any other data over the network 414. Further, the instructions 416 may be transmitted or received over the network 414 via a communication port or interface 412, and/or using a bus 418. The communication port or interface 412 may be a part of the processor 402 or may be a separate component. The communication port or interface 412 may be created in software or may be a physical connection in hardware. The communication port or interface 412 may be configured to connect with a network 414, external media, the display 408, or any other components in controller 400, or combinations thereof. The connection with the network 414 may be a physical connection, such as a wired Ethernet connection or may be established wirelessly as discussed below. Likewise, the additional connections with other components of the controller 400 may be physical connections or may be established wirelessly. The network 414 may alternatively be directly connected to a bus 418.

While the computer-readable medium 420 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 420 may be non-transitory, and may be tangible.

The computer-readable medium 420 can include a solid-state memory such as a memory card or other package that houses one or more non-volatile read-only memories. The computer-readable medium 420 can be a random-access memory or other volatile re-writable memory. Additionally or alternatively, the computer-readable medium 420 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 400 may be connected to a network 414. The network 414 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 414 may include wide area networks (WAN), such as the Internet, local area networks (LAN), campus area networks, metropolitan area networks, a direct connection such as through a Universal Serial Bus (USB) port, or any other networks that may allow for data communication. The network 414 may be configured to couple one computing device to another computing device to enable communication of data between the devices. The network 414 may generally be enabled to employ any form of machine-readable media for communicating information from one device to another. The network 414 may include communication methods by which information may travel between computing devices. The network 414 may be divided into sub-networks. The sub-networks may allow access to all of the other components connected thereto or the sub-networks may restrict access between the components. The network 414 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 5A:
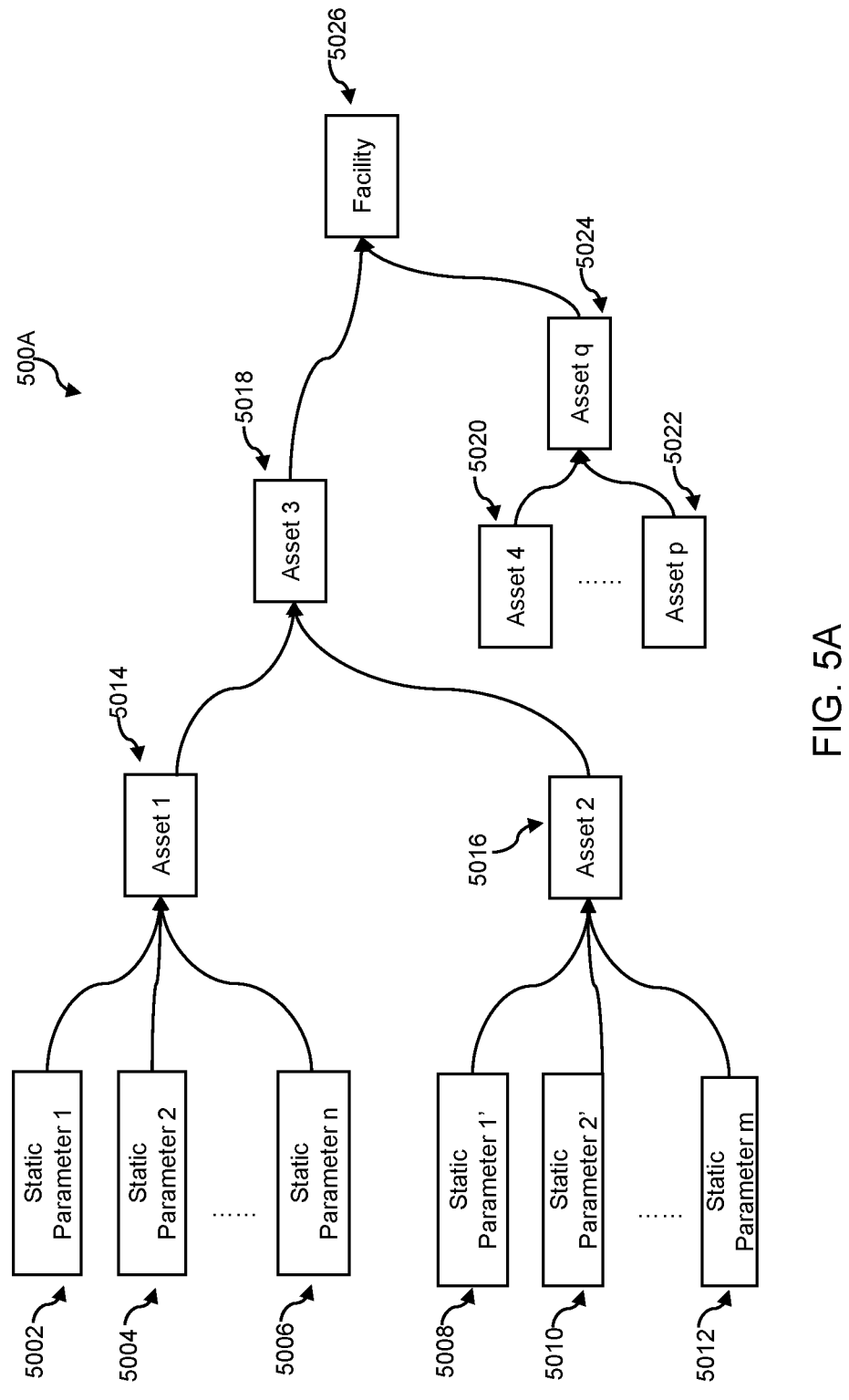
FIGS. 5A-5D illustrates a schematic diagram showing an exemplary hierarchical representation of one or more assets in a facility in accordance with one or more example embodiments described herein.

FIG. 5A illustrates a schematic diagram showing an exemplary hierarchical representation of one or more assets in a facility in accordance with one or more example embodiments described herein. The facility 5026 (e.g., a building facility, a warehouse, an industrial plant, a material handling system, a distribution center, a sorting station, a picking station, and/or the like) may comprise multiple assets 5014-5024. In some example embodiments, at least some of the assets 5014-5024 can be of same type. In some example embodiments, at least some of the assets 5014-5024 can be of different type. In this regard, assets 5014-5024 can be, for example, but not limited to, sensors, electronic components, pressure valves, HVACs, alarm units, building management systems, building controllers, industrial subsystems, industrial controllers, lightning systems, air detective systems, air quality sensors, and/or the like.

In some example embodiments, the assets 5014-5024 can be communicatively coupled to each other. In some example embodiments, at least some of the assets 5014-5024 can be coupled to each other by wired means. In some example embodiments, at least some of the assets 5014-5024 can be wirelessly coupled to each other over a network. In some exemplary embodiments, the network can be, but not limited to a BACnet network, a NIAGARA network, a NIAGARA CLOUD network, and/or the like. In some example embodiments, the network 612 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In this regard, in some example embodiments, Asset 1 (5014) and Asset 2 (5016) may be communicatively coupled to Asset 3 (5018) in the facility 5026. Further, in some example embodiments, Asset 4 (5020)-Asset p (5022) may be communicatively coupled to Asset q (5024) in the facility 5026. Though Asset 3 (5018) and Asset q (5024) are not communicatively coupled with each other, an inter-relationship may exist between these assets in the facility 5026. Similarly, though Asset 4 (5020)-Asset p (5022) is not communicatively coupled with Asset 1 (5014) and Asset 2 (5016), an inter-relationship may exist between these assets in the facility 5026. Further, in some exemplary embodiments, as illustrated in FIG. 5A, the assets 5014-5024 can be arranged in an hierarchical manner 500A in one or more levels. In this regard, in some example embodiments, Asset 1 (5014) and Asset 2 (5016) may be arranged at a first level. Further, in some example embodiments, Asset 3 (5018) and Asset 4 (5020)-Asset p (5022) may be arranged at a second level. Further, in some example embodiments, Asset q (5024) may be arranged at a third level of the hierarchy. In some example embodiments, the levels at which the assets are placed may be interchangeable. In some example embodiments, the knowledge graphs 334 described in accordance with FIG. 3 of the current disclosure may comprise the exemplary hierarchical representation described herein. Further, in some example embodiments, the knowledge graphs may utilize the exemplary hierarchical representation described herein to generate dynamic representations for the assets 5014-5024 in the facility 5026.

In some example embodiments, each of the assets 5014-5024 in the facility 5026 can be associated with one or more static parameters 5002-5012. That is, each asset can have one or more parameters/properties that do not change with respect to time. Accordingly, one or more static parameters 5002-5012 for each of the respective assets 5014-5024 in the facility 5026 is identified. For example, in some example embodiments, Asset 1 (5014) may be a temperature sensor configured to sense temperature only. This characteristic of the temperature sensor is constant. Accordingly, temperature corresponds to a static property for the temperature sensor. In this regard, one of the static parameters 5002-5006 may correspond to temperature. Similarly, in some example embodiments, Asset 1 (5014) may comprise other static parameters as well. In another example, Asset 1 (5014) may be a vibration sensor configured to sense vibration in another asset say, Asset 3 (5018) which may be a conveyor. This characteristic of the vibration sensor is constant. Accordingly, vibration corresponds to a static property for the vibration sensor. In this regard, one of the static parameters 5002-5006 may correspond to vibration. Further, in some exemplary embodiments, the one or more static parameters 5002-5012 can correspond to physical attributes of an asset. For example, Asset 2 (5016) may be a pump that may comprise an inlet value and an outlet valve. These valves are fixed for the pump and may correspond to physical attributes of the pump which are static in nature. Accordingly, one or more of the static parameters 5008-5012 may correspond to the valves of the pump. The one or more static parameters 5002-5012 described herein are exemplary only and may correspond to several other properties/parameters associated with the assets. In this regard, the properties/parameters may also correspond to voltage, current, speed, torque, pressure, and/or the like. In some example embodiments, the properties/parameters may also correspond to location of asset(s) in the facility and/or category to which asset(s) belongs to in the facility. Further, in some example embodiments, the exemplary hierarchical representation may comprise additional information such as metadata, location data, telemetry data, and/or other data that is associated with the assets 5014-5024 in the facility 5026. Further, in some example embodiments, the knowledge graphs 334 may utilize the exemplary hierarchical representation described herein to generate static vectors and/or dynamic representations for the assets 5014-5024 in the facility 5026. In some example embodiments, static vectors and/or dynamic representation generated for a first asset may be used to generate a dynamic representation for a second asset. In this regard, in some example embodiments, a dynamic representation for the facility 5026 may be generated based on the dynamic representations generated for the assets 5014-5024 in the facility 5026.

Figure 5B:
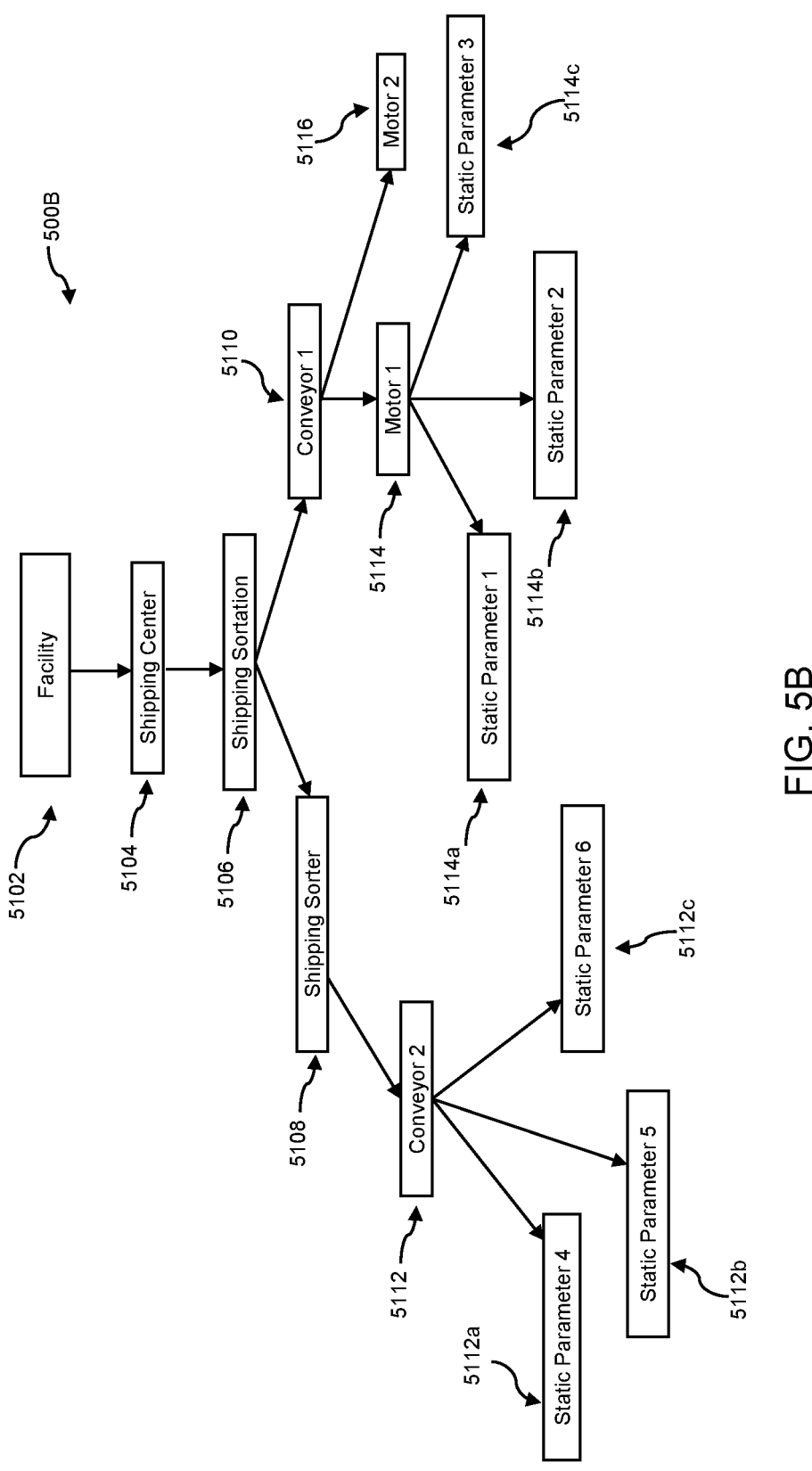

FIG. 5B illustrates a schematic diagram showing exemplary hierarchical representation of one or more assets in a facility in accordance with one or more example embodiments described herein. In some example embodiments described herein, the facility 5102 may correspond to a material handling system. In this regard, the facility 5102 may correspond to a distribution center, a warehouse, a factory, and/or the like. In some exemplary embodiments, a portion of the facility 5102 may correspond to a shipping center 5104 where one or more objects such as packages, parcels, boxes, cases, cartons, pallets and/or other objects are handled. Further, in some exemplary embodiments, the shipping center 5104 may further comprise shipping sortation center 5106 where the one or more objects are sorted for further processing in the facility 5102.

In some example embodiments, the shipping sortation center 5106 comprises multiple assets 5108-5116 such as sorters, conveyors, motors, and/or the like to handle one or more objects in the facility 5102. In some example embodiments, the assets 5108-5116 can be communicatively coupled to each other. In some example embodiments, at least some of the assets 5108-5116 can be coupled to each other by wired means. In some example embodiments, at least some of the assets 5108-5116 can be wirelessly coupled to each other over a network. In some exemplary embodiments, the network can be, but not limited to a BACnet network, a NIAGARA network, a NIAGARA CLOUD network, and/or the like. In some example embodiments, the network 612 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In this regard, in some example embodiments, Conveyor 2 (5112) and shipping sorter 5108 may be communicatively coupled to each other in the facility 5102. Further, in some example embodiments, Conveyor 1 (5110) may be communicatively coupled to Motor 1 (5114) and Motor 2 (5116) in the facility 5102. Though Conveyor 2 (5112) and shipping sorter 5108 are not communicatively coupled with Conveyor 1 (5110), an inter-relationship may exist between these assets in the facility 5102. Similarly, though Motor 1 (5114) and Motor 2 (5116) are not communicatively coupled with Conveyor 2 (5112) and shipping sorter 5108, an inter-relationship may exist between these assets in the facility 5102.

In some example embodiments, multiple assets 5108-5116 may be arranged in an hierarchical manner 500B as illustrated in FIG. 5B. In this regard, in some example embodiments, the facility 5102 can comprise assets such as shipping sorter 5108, Conveyor 1 (5110), Conveyor 2 (5112), Motor 1 (5114), and Motor 2 (5116). Further, in some example embodiments, shipping sorter 5108 and Conveyor 1 (5110) may be arranged at a first level of the hierarchy. In some example embodiments, Conveyor 2 (5112), Motor 1 (5114), and Motor 2 (5116) may be arranged at a second level of the hierarchy. In some example embodiments, the levels at which the assets are placed may be interchangeable. In some example embodiments, the knowledge graphs 334 described in accordance with FIG. 3 of the current disclosure may comprise the exemplary hierarchical representation described herein. Further, in some example embodiments, the knowledge graphs 334 may utilize the exemplary hierarchical representation described herein to generate dynamic representations for the assets 5108-5116 in the facility 5102.

In some example embodiments, one or more static parameters associated with at least some of the assets 5108-5116 in the facility 5102 may be identified. In this regard, in some example embodiments, one or more static parameters 5112a-5112c associated only with Conveyor 2 (5112) may be identified. Further, in some example embodiments, one or more static parameters 5114a-5114c associated only with Motor 1 (5114) may be identified. In some exemplary embodiments, the one or more static parameters described herein may correspond to properties/parameters of the assets that do not change with time. Further, in some exemplary embodiments, the one or more static parameters described herein may correspond to one or more physical attributes of the assets. In some example embodiments, the one or more static parameters described herein may be same as that of the one or more static parameters described in accordance with FIG. 5A of the current disclosure. Further, in some example embodiments, the exemplary hierarchical representation may comprise additional information such as metadata, location data, telemetry data, and/or other data that is associated with the assets 5108-5116 in the facility 5102. Further, in some example embodiments, the knowledge graphs 334 may utilize the exemplary hierarchical representation described herein to generate static vectors and/or dynamic representations for the assets 5108-5116 in the facility 5102. In some example embodiments, static vectors and/or dynamic representation generated for a first asset may be used to generate a dynamic representation for a second asset. In this regard, in some example embodiments, a dynamic representation for the shipping center 5104 may be generated based on the dynamic representations generated for the assets 5108-5116 in the facility 5102.

Figure 5C:
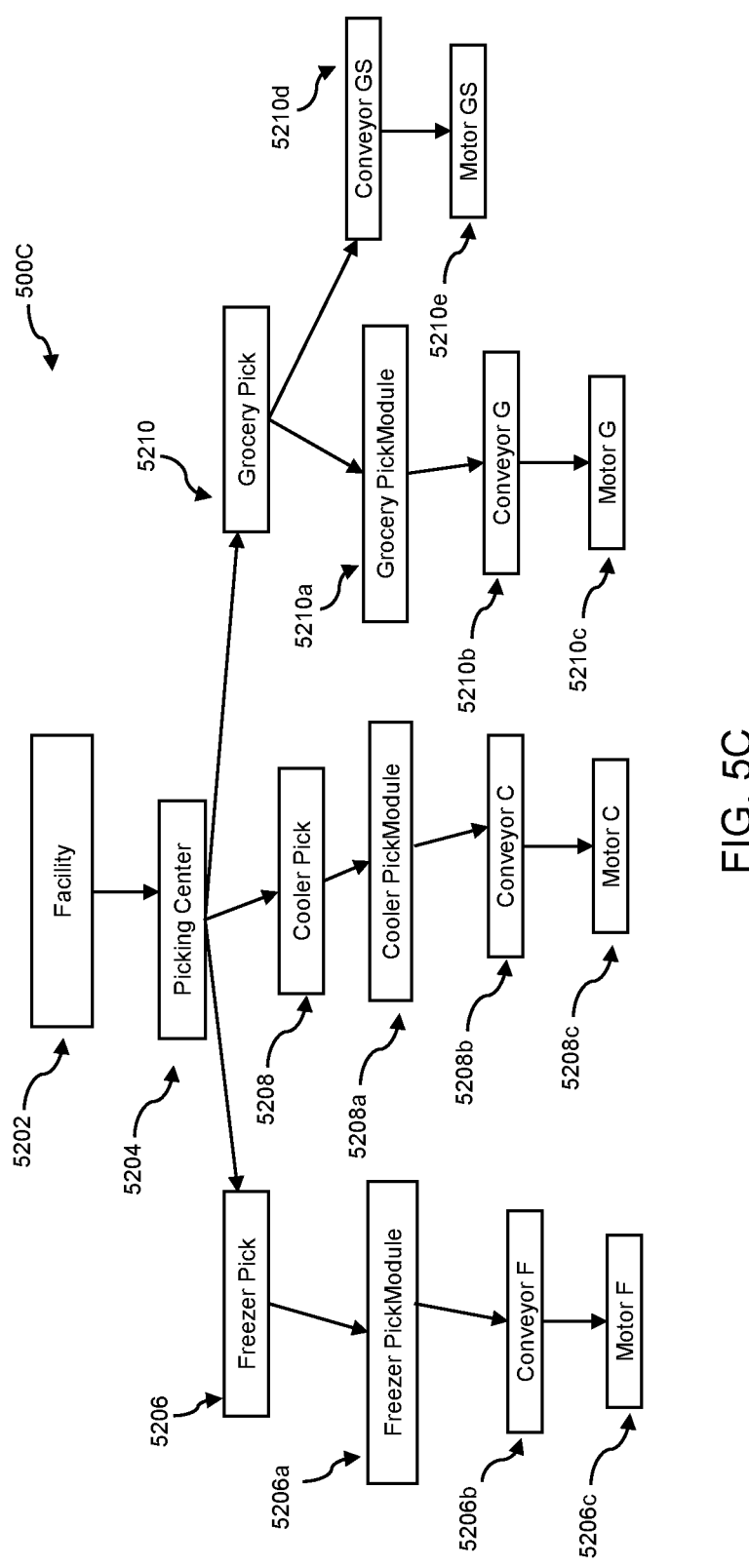

FIG. 5C illustrates a schematic diagram showing an exemplary hierarchical representation of one or more assets in a facility in accordance with one or more example embodiments described herein. In some example embodiments described herein, the facility 5202 may be same as that of facility 5102 described in accordance with FIG. 5B of the current disclosure. Accordingly, in some example embodiments described herein, the facility 5202 may correspond to a material handling system. Further, in some example embodiments described herein, the facility 5202 may comprise a picking center 5204 from where one or more objects such as packages, parcels, boxes, cases, cartons, pallets and/or other objects are stored. In some example embodiments, the picking center 5204 may be further divided into one or more sub-centers based at least in part on an environment in which the one or more objects are placed. In some example embodiments, the picking center 5204 may be further divided into one or more sub-centers based at least in part on a type of the one or more objects that is to be stored in the picking center 5204. In this regard, the picking center 5204 may comprise freezer pick 5206, cooler pick 5208, and/or grocery pick 5210 as sub-centers. In some example embodiments, each of the one or more sub-centers may comprise one or more assets arranged in an hierarchical manner as illustrated in 500C. The assets can be, but not limited to conveyor, sensor, motor, and/or the like. In some example embodiments, levels at which the assets are placed in the hierarchy may be interchangeable.

In one or more example embodiments, freezer pick 5206 comprises Freezer PickModule 5206*a*. Further, in some example embodiments, Freezer PickModule 5206*a* may further comprise a corresponding Conveyor F 5206*b*. In some example embodiments, Conveyor F 5206*b* may be configured to handle one or more objects placed in freezer pick 5206. Further, in some example embodiments, the Conveyor F 5206*b* may further comprise Motor F 5206*c*. In one or more example embodiments, cooler pick 5208 comprises Cooler PickModule 5208*a*. Further, in some example embodiments, Cooler PickModule 5208*a* may further comprise a corresponding Conveyor C 5208*b*. In some example embodiments, Conveyor C 5208*b* may be configured to handle one or more objects placed in cooler pick 5208.

Further, in some example embodiments, the Conveyor C 5208*b* may further comprise Motor C 5208*c*. In one or more example embodiments, grocery pick 5210 comprises Grocery PickModule 5210*a*. Further, in some example embodiments, Grocery PickModule 5210*a* may further comprise a corresponding Conveyor G 5210*b*. In some example embodiments, Conveyor G 5210*b* may be configured to handle one or more objects placed in grocery pick 5210. Further, in some example embodiments, the Conveyor G 5210*b* may further comprise Motor G 5210*c*. In addition, in some example embodiments, grocery pick 5210 may additionally comprise Conveyor GS 5210*d* along with a corresponding Motor GS 5210*e*. In some example embodiments, an inter-relationship may exist between assets of sub-centers in the facility 5202.

In some example embodiments, the knowledge graphs 334 described in accordance with FIG. 3 of the current disclosure may comprise the exemplary hierarchical representation described herein. In this regard, in some example embodiments, the knowledge graphs 334 may utilize the exemplary hierarchical representation described herein to generate a dynamic representation for Motor F 5206*c*. Further, in some example embodiments, the knowledge graphs 334 may utilize the dynamic representation for Motor F 5206*c* to generate dynamic representation for Conveyor F 5206*b*. Similarly, in some example embodiments, the knowledge graphs 334 may utilize the dynamic representation for Conveyor F 5206*b* to generate dynamic representation for Freezer PickModule 5206*a*. Further, in some example embodiments, the knowledge graphs 334 may utilize the dynamic representation for Freezer PickModule 5206*a* to generate dynamic representation for freezer pick 5206. Similarly, in some example embodiments, dynamic representations for cooler pick 5208 and grocery pick 5210 may be generated. Further, in some example embodiments, a dynamic representation for picking center 5204 may be generated based on the dynamic representations generated for freezer pick 5206, cooler pick 5208, and/or grocery pick 5210. In this regard, a dynamic representation generated for freezer pick 5206 may be used to predict a maintenance requirement for an asset in cooler pick 5208 and/or grocery pick 5210.

Figure 5D:
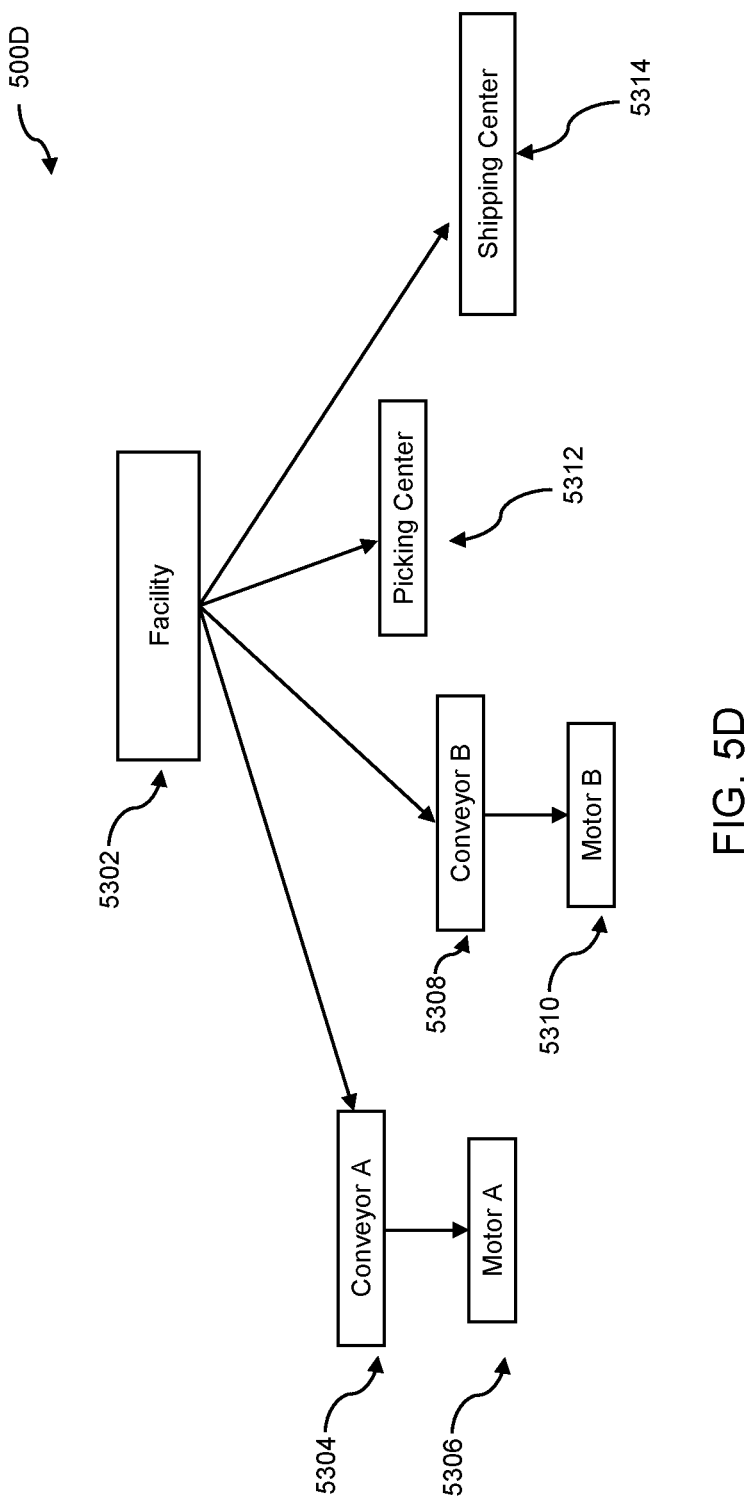

FIG. 5D illustrates a schematic diagram showing an exemplary hierarchical representation of one or more assets in a facility in accordance with one or more example embodiments described herein. In some example embodiments described herein, the facility 5302 may be same as that of facility 5102 described in accordance with FIG. 5B and facility 5202 described in accordance with FIG. 5C of the current disclosure. Accordingly, in some example embodiments described herein, the facility 5302 may correspond to a material handling system. Further, in some example embodiments described herein, the facility 5302 may comprise a picking center 5312 and a shipping center 5314. In some example embodiments described herein, the picking center 5312 may be same as that of picking center 5204 described in FIG. 5C of the current disclosure. In some example embodiments described herein, the shipping center 5314 may be same as that of shipping center 5104 described in FIG. 5B of the current disclosure. Further, in some example embodiments described herein, the facility 5302 may comprise conveyors, motors, and/or other assets in a hierarchical manner 500D. Accordingly, in some example embodiments, the facility 5302 may comprise Conveyor A 5304 along with a corresponding Motor A 5306. Further, in some example embodiments, the facility 5302 may comprise Conveyor B 5308 along with a corresponding Motor B 5310.

In some example embodiments, an inter-relationship may exist between various assets in the facility 5302.

In some example embodiments, the hierarchical representation 500D may comprise dynamic representation of various assets in the facility. In this regard, in some example embodiments, shipping center 5314 in the hierarchical representation 500D may be indicative of a dynamic representation of the shipping center 5314 that is determined in accordance with FIG. 5B of the current disclosure. Further, in some example embodiments, picking center 5312 in the hierarchical representation 500D may be indicative of a dynamic representation of the picking center 5312 that is determined in accordance with FIG. 5C of the current disclosure. In some example embodiments, the knowledge graphs 334 may utilize the exemplary hierarchical representation described herein to generate a dynamic representation for each of Conveyor A 5304, Motor A 5306, Conveyor B 5308, and Motor B 5310 in the facility 5302. Further, in some example embodiments, the knowledge graphs 334 may utilize the dynamic representations for picking center 5312 and shipping center 5314 along with the dynamic representation for each of Conveyor A 5304, Motor A 5306, Conveyor B 5308, and Motor B 5310 to determine a dynamic representation for the facility 5302. In some example embodiments, the dynamic representation for the facility 5302 may be used to predict a maintenance requirement for an asset in the facility.

Figure 6:
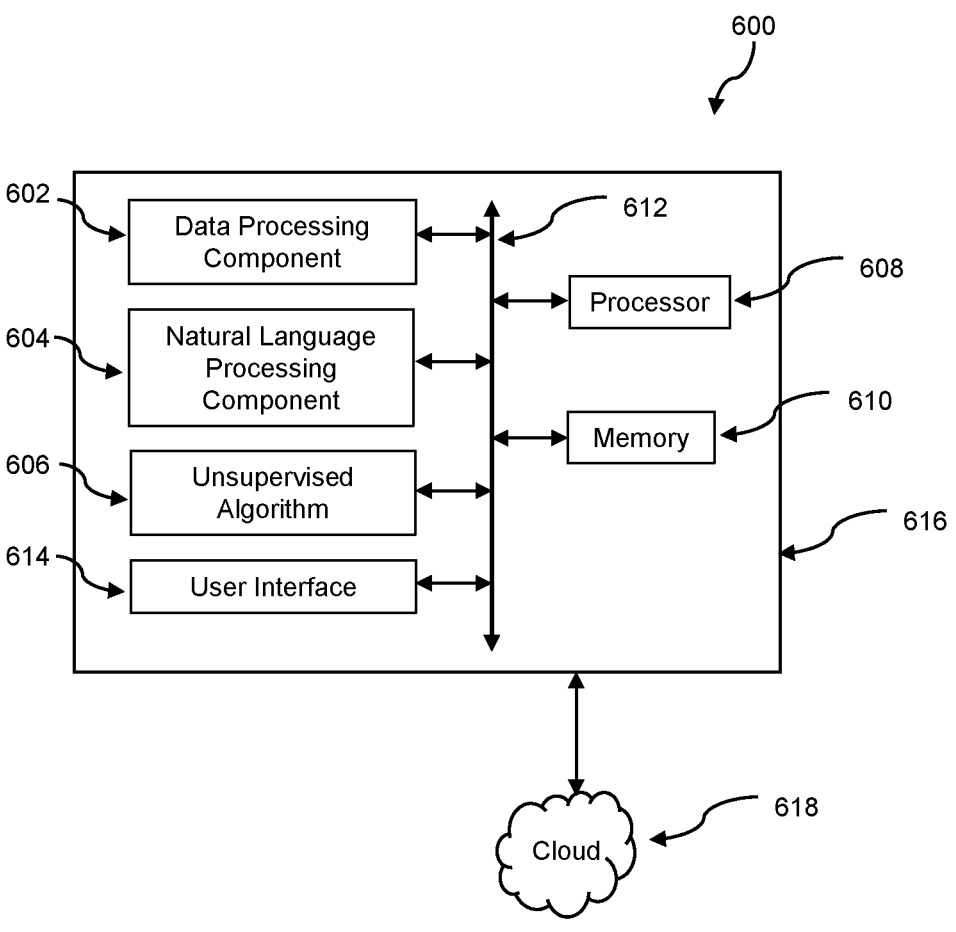
FIG. 6 illustrates a schematic diagram showing an exemplary implementation of a facility management system in accordance with one or more example embodiments described herein.

FIG. 6 illustrates a schematic diagram showing an exemplary implementation of a facility management system in accordance with one or more example embodiments described herein. In some example embodiments, the facility management system 600 may be used to generate dynamic representation of assets in the facility. In some example embodiments, the facility management system 600 may be configured to analyze hierarchical structure of assets in the facilities 102. Further, in some example embodiments, the facility management system 600 may receive telemetry data associated with facilities 102. In some example embodiments, the system 600 is configured to analyze telemetry data. According to some example embodiments, the system 600 facilitates a practical application of data analytics technology and/or digital transformation technology to generate dynamic representation of assets in the facility. in this regard, the facility management system 600 may predict a maintenance requirement for the assets in the facilities 102. In this regard, in some example embodiments, the facility management system 600 may generate one or more service cases in accordance with the prediction of maintenance requirement for the assets in the facilities 102. In some example embodiments, the facility management system 600 may be alter the configuration of one or more assets in the facilities 102 in accordance with the prediction of maintenance requirement for the assets in the facilities 102.

In some example embodiments, the facility management system 600 is a server system (e.g., a server device) that facilitates a data analytics platform between one or more computing devices, one or more data sources, and/or one or more assets. In one or more example embodiments, the facility management system 600 is a device with one or more processors and a memory. For example, in one or more example embodiments, the facility management system 600 is implemented via the cloud 106. The facility management system 600 is also related to one or more technologies, such as, for example, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies.

In some example embodiments, the exemplary facility management system 600 may comprise one or more components such as, data processing component 602, natural language processing component 604, unsupervised algorithm 606, and/or user interface 614. Additionally, in some example embodiments, the facility management system 600 may comprise a processor 608 and/or memory 610. In some example embodiments, data processing component 602, natural language processing component 604, unsupervised algorithm 606, user interface 614, processor 608, and/or memory 610 may reside within block 616. In some example embodiments described herein, each component within the block 616 may be communicatively coupled to each other via network 612. In some example embodiments, network 612 may independently be, for example, a BACnet network, a NIAGARA network, a NIAGARA CLOUD network, or others. In some example embodiments, the network 612 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. Further, in some example embodiments, the block 616 may be communicatively coupled to cloud 618. Also, in some example embodiments, the facility management system 600 may be implemented via the cloud 618. In this regard, in some example embodiments, the block 616 may be communicatively coupled to the cloud 618 over a network. In some example embodiments, the network may be for example, a BACnet network, a NIAGARA network, a NIAGARA CLOUD network, or others. In some example embodiments, the cloud 618 may be same as that of cloud 106 described in accordance with FIG. 1 of the current disclosure. In certain example embodiments, one or more aspects of the facility management system 600 (and/or other systems, apparatuses and/or processes disclosed herein) constitute executable instructions embodied within a computer-readable storage medium (e.g., the memory 610). For instance, in an example embodiment, the memory 610 stores computer executable component and/or executable instructions (e.g., program instructions). Furthermore, the processor 608 facilitates execution of the computer executable components and/or the executable instructions (e.g., the program instructions). In an example embodiment, the processor 608 is configured to execute instructions stored in memory 610 or otherwise accessible to the processor 608.

The processor 608 is a hardware entity (e.g., physically embodied in circuitry) capable of performing operations according to one or more embodiments of the disclosure. Alternatively, in an example embodiment where the processor 608 is embodied as an executor of software instructions, the software instructions configure the processor 608 to perform one or more algorithms and/or operations described herein in response to the software instructions being executed. In an example embodiment, the processor 608 is a single core processor, a multi-core processor, multiple processors internal to the facility management system 600, a remote processor (e.g., a processor implemented on a server), and/or a virtual machine. In certain example embodiments, the processor 608 is in communication with the memory 610, data processing component 602, natural language processing component 604, and/or unsupervised algorithm 606 via a bus and/or network 612 to, for example, facilitate transmission of data among the processor 608, the memory 610, data processing component 602, natural language processing component 604, unsupervised algorithm 606, and/or user interface 614. The processor 608 may be embodied in a number of different ways and, in certain example embodiments, includes one or more processing devices configured to perform independently. Additionally or alternatively, in one or more example embodiments, the processor 608 includes one or more processors configured in tandem via a bus to enable independent execution of instructions, pipelining of data, and/or multi-thread execution of instructions.

The memory 610 is non-transitory and includes, for example, one or more volatile memories and/or one or more non-volatile memories. In other words, in one or more example embodiments, the memory 610 is an electronic storage device (e.g., a computer-readable storage medium). The memory 610 is configured to store information, data, content, one or more applications, one or more instructions, or the like, to enable the facility management system 600 to carry out various functions in accordance with one or more embodiments disclosed herein. In accordance with some example embodiments described herein, the memory 610 may correspond to an internal or external memory of the facility management system 600. In some examples, the memory 610 may correspond to a database communicatively coupled to the facility management system 600. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor circuitry, an executable component, a thread of instructions, a program, and/or a computer entity.

In some example embodiments, data processing component 602 is configured to receive hierarchical representation of one or more assets in a facility. In some example embodiments, the knowledge graphs 334 may provide hierarchical representation of one or more assets in the facility. In some example embodiments, the hierarchical representation of one or more assets may correspond to one or more exemplary hierarchical representations as described in FIGS. 5A-5D of the current disclosure. Further, in some example embodiments, the data processing component 602 is configured to process hierarchical representation for each of the one or more assets to generate one or more sequential representations for each of the one or more assets. In this regard, the data processing component 602 is configured to identify a hierarchical representation for each of the one or more assets. In some example embodiments, one or more sequential representations comprises a hierarchical representation for each individual asset and/or each static parameters associated with an asset. In some example embodiments, the one or more sequential representations may represent an individual hierarchy for each individual asset and/or each static parameters associated with an asset. In some exemplary embodiments, the sequential representation may indicate a relation between various assets in the facility. For example, a sequential representation for a static parameter 1 (5002) may comprise an individual hierarchical representation for the static parameter 1 (5002). In some example embodiments, a sequential representation may also comprise a relation between the static parameter 1 (5002) with a location and/or a category of the asset in the facility. In this regard, an exemplary hierarchical representation or sequential representation for the static parameter 1 (5002) may comprise Asset 1 (5014), Asset 3 (5018), and facility 5026. In some example embodiments, the exemplary sequential representation for the static parameter 1 (5002) may indicate that the static parameter 1 (5002) is associated with or related to Asset 1 (5014). Further, in some example embodiments, the exemplary sequential representation may indicate that Asset 1 (5014) is in turn related to Asset 3 (5018) located in the facility 5026. Similarly, in other example embodiments, one or more sequential representations can be determined for other static parameters and/or assets in the facility 5026. Other exemplary sequential representations and details are described in accordance with FIG. 7 of the current disclosure.

In some example embodiments, data processing component 602 is configured to transmit the one or more sequential representations to the natural language processing component 604. In some example embodiments, the natural language processing component 604 may comprise one or more algorithms that is configured to convert the one or more sequential representations into a numerical form. In this regard, in some example embodiments, one or more words in the one or more sequential representations may be converted into a numerical representation. In some example embodiments, one of the one or more algorithms in the natural language processing component 604 may be Word2Vec. In some example embodiments, the numerical representation may be a vectorial representation. In some example embodiments, the vectorial representation may comprise numerical values or weights. In some example embodiments, the numerical values or weights may be equivalent to words that are used in one or more sequential representations. For example, if static parameter 1 (5002) in a sequential representation corresponds to "temperature", then "temperature" may be converted into a vectorial representation. Similarly, in some example embodiments, if Asset 1 (5014) in a sequential representation corresponds to a "pump", then "pump" may be converted into a vectorial representation. Accordingly, in some exemplary embodiments, the natural language processing component 604 may convert the one or more sequential representation of each individual asset and/or each static parameters in the facility into vectorial representation. In some example embodiments, the vectorial representation may correspond to first vectors. Some other exemplary vectorial representations and details are described more in accordance with FIG. 8 of the current disclosure.

In some example embodiments, the natural language processing component 604 may transmit vectorial representation of each individual asset and/or each static parameters in the facility to the data processing component 602. Further, in some example embodiments, the data processing component 602 is configured to receive telemetry data from one or more assets in the facility. In some example embodiments, the telemetry data may be received by the data processing component 602 at pre-defined intervals from one or more assets in the facility. In some exemplary embodiments, the telemetry data may be received by the data processing component 602 as a continuous data stream in near-real time from one or more assets in the facility. In some example embodiments, the telemetry data is timestamped. Further, in some example embodiments, the telemetry data may comprise metadata associated with the assets in the facility. In some example embodiments, memory 610 may be configured to store the telemetry data received from one or more assets in the facility. In some example embodiments, the memory 610 may be multivariate time series database. Further, in some example embodiments, the memory 610 may store the telemetry data for one or more intervals of time (e.g., 1 minute to 12 minutes, 1 hour to 24 hours, 1 day to 31 days, 1 month to 12 months, etc.) and/or for one or more asset hierarchy levels (e.g., asset level, asset zone, building level, building zone, plant level, plant zone, industrial site level, etc.). In a non-limiting embodiment, the multivariate time series database stores the telemetry data for a first interval of time (e.g., 1 hour to 24 hours minutes) for a first asset (e.g., a first asset hierarchy level), for a second interval of time (e.g., 1 day to 31 days) for the first asset, and for a third interval of time (e.g., 1 month to 12 months) for the first asset. Furthermore, in the non-limiting embodiment, the memory 610 stores the telemetry data for the first interval of time (e.g., 1 hour to 24 hours minutes) for all assets in a connected building (e.g., a second asset hierarchy level), for the second interval of time (e.g., 1 day to 31 days) for all the assets in the connected building, and for the third interval of time (e.g., 1 month to 12 months) for the all the assets in the connected building. In the non-limiting embodiment, the memory 610 also stores the telemetry data for the first interval of time (e.g., 1 hour to 24 hours minutes) for all connected buildings within a particular geographic region (e.g., a third asset hierarchy level), for the second interval of time (e.g., 1 day to 31 days) for all connected buildings within the particular geographic region, and for the third interval of time (e.g., 1 month to 12 months) for all connected buildings within the particular geographic region. Additionally, in one or more example embodiments, the memory 610 stores at least a portion of the telemetry data associated with two or more variables (e.g., two or more features) associated with the portfolio of assets. As such, in one or more embodiments, the memory 610 stores multivariate data (e.g., multivariate time series data) associated with the one or more assets (e.g., the edge devices 312a-312n).

In some example embodiments, the data processing component 602 is configured to relate the telemetry data with vectorial representation of each individual asset and/or each static parameters in the facility. In this regard, the data processing component 602 is configured to perform a product of vectorial representation of an asset and/or static parameter with telemetry data associated with the asset. In some example embodiments, the data processing component 602 can perform the product of vectorial representation of an asset and/or static parameter with telemetry data associated with the asset at each individual timestamps. Accordingly, in some example embodiments, the data processing component 602 is configured to generate one or more second vectors for the asset at each individual timestamps based on the product. An exemplary block diagram of corresponding to generation of one or more second vectors is described in more detail in accordance with FIG. 9 of the current disclosure.

In some example embodiments, the data processing component 602 is configured to transmit the one or more second vectors to unsupervised algorithm 606. In some example embodiments, the unsupervised algorithm 606 may be an adversarial network. In this regard, in some example embodiments, the unsupervised algorithm 606 is configured to convolute the one or more second vectors. In this regard, in some example embodiments, the unsupervised algorithm 606 determines a weight matrix using the one or more second vectors at each individual timestamps. Further, in some example embodiments, the unsupervised algorithm 606 is also trained based on the weight matrix. That is, in some example embodiments, the weight matrix is utilized as a feedback to further train the unsupervised algorithm 606. In some example embodiments, the unsupervised algorithm 606 is configured to generate the dynamic representation for the asset based on convolution of the one or more second vectors. In some example embodiments, the dynamic representation for the asset is used to predict a maintenance requirement for the asset. In this regard, in some example embodiments, data processing component 602 may be configured to generate one or more service cases in accordance with the prediction for maintenance requirement. Further, in some example embodiments, the one or more service cases may be rendered on a user interface 614 for display for a personnel in the facility. Also, in some example embodiments, the unsupervised algorithm 606 may utilize dynamic representation generated for the asset to predict a maintenance requirement for other assets in a same hierarchy of assets in the facility. Also, in some example embodiments, the unsupervised algorithm 606 may utilize dynamic representation generated for the asset to predict a maintenance requirement for other assets in a different hierarchy of assets in the facility. In some example embodiments, the unsupervised algorithm 606 may utilize the dynamic representation for the asset to generate another dynamic representation for another asset that is related to the asset in a hierarchy. In another example embodiment, the unsupervised algorithm 606 may utilize dynamic representation generated for one or more assets in the facility to eventually generate a dynamic representation for the facility. An exemplary block diagram of corresponding to generation of dynamic representation for one or more assets is described in more detail in accordance with FIGS. 10 and 11 of the current disclosure.

Figure 7:
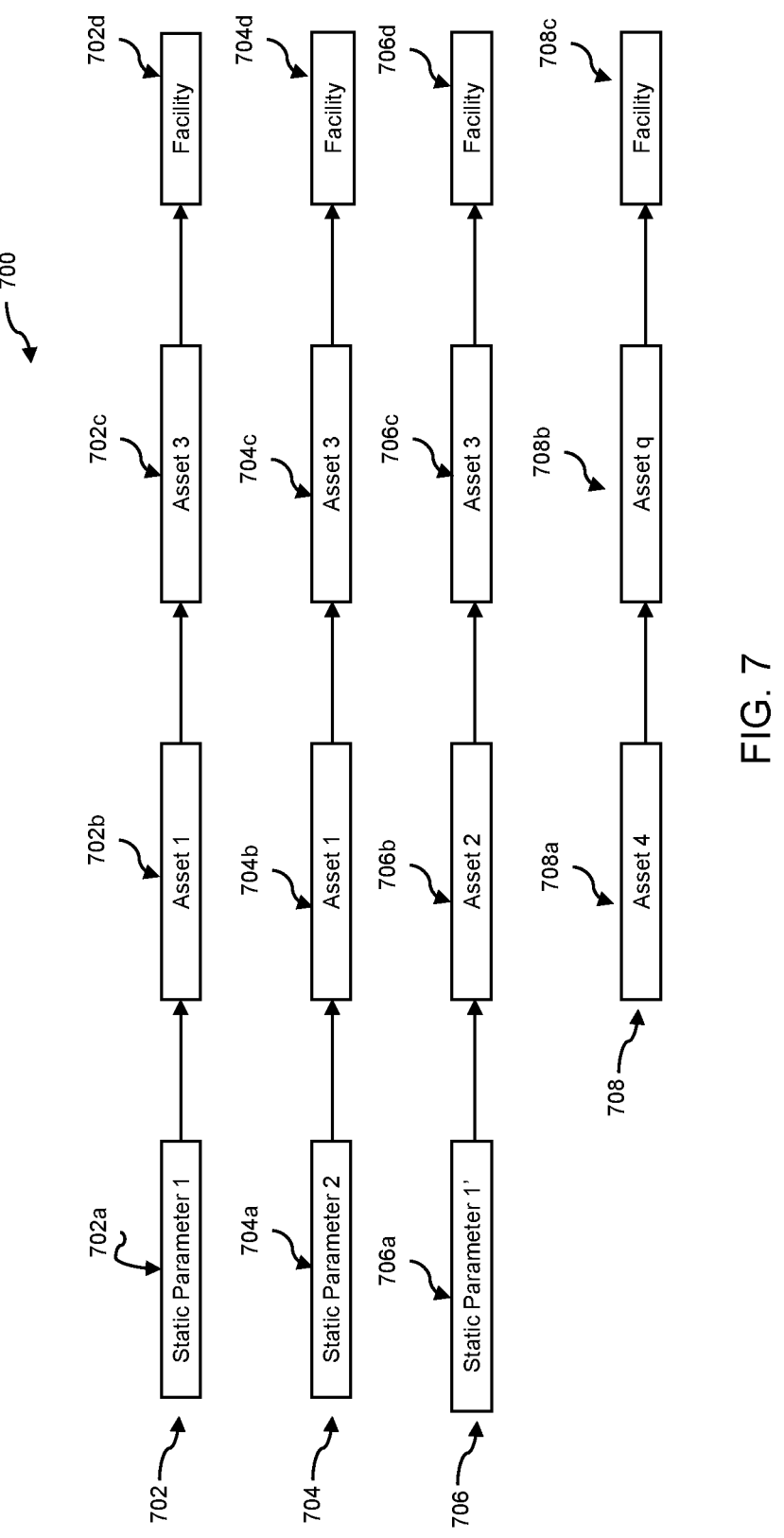
FIG. 7 illustrates a schematic diagram showing an exemplary sequential representation of an exemplary hierarchical representation of one or more assets in a facility in accordance with one or more example embodiments described herein.

FIG. 7 illustrates a schematic diagram showing an exemplary sequential representation of a hierarchical representation of one or more assets in a facility in accordance with one or more example embodiments described herein. In some example embodiments, one or more sequential representations 702-708 (collectively "sequential representations 700") described herein may be associated with the exemplary hierarchical representation as described in FIG. 5A of the current disclosure. In some example embodiments, data processing component 602 is configured to process hierarchical representation for each of the one or more assets to generate one or more exemplary sequential representations for each of the one or more assets. In this regard, data processing component 602 is configured to generate one or more exemplary sequential representations 702-708. Each of the one or more exemplary sequential representations 702-708 may represent individual hierarchy for a static parameter and/or an asset in a facility.

In some example embodiments, an exemplary sequential representation 702 may represent an individual hierarchy for a static parameter. In this regard, the exemplary sequential representation 702 for static parameter 1 (5002) may comprise blocks 702a, 702b, 702c, and 702d. In some example embodiments, first block 702a may comprise static parameter 1 (5002). For example, if static parameter 1 (5002) corresponds to temperature, then block 702a may comprise temperature. In another example, if static parameter 1 (5002) corresponds to current, then block 702a may comprise current. Further, in some example embodiments, second block 702*b* may comprise an asset with which the static parameter 1 (5002) is associated with. For example, if static parameter 1 (5002) corresponds to temperature, then the asset with which it is associated with may be a temperature sensor. In this regard, the block 702*b* may comprise temperature sensor. In another example, if static parameter 1 (5002) corresponds to current, then the asset with which it is associated with may be a motor. In this regard, the block 702*b* may comprise motor. Further, in some example embodiments, third block 702*c* may further comprise another asset with which the asset in block 702*b* may be related to. In this regard, in some example embodiments, if block 702*b* corresponds to a motor, then block 702*c* may comprise a conveyor. In some example embodiments, the assets in blocks 702*b* and 702*c* can be a same asset. That is, the temperature sensor or motor may be a component within the conveyor. In some example embodiments, the assets in blocks 702*b* and 702*c* can correspond to different assets. In some example embodiments, a sequential representation for assets in blocks 702*b* and 702*c* can also be generated separately based on the sequential representation 702. Further, in some example embodiments, fourth block 702*d* may further comprise facility in which the assets are situated. In this regard, the facility may also comprise location details of the facility. Also, in some example embodiments, blocks 702*a*, 702*b*, and 702*c* may also comprise additional information such as location details and category of assets in the facility. Accordingly, in other example embodiments, data processing component 602 can be configured to generate other sequential representations 704-708 similar to that of sequential representation 702.

Figure 8:
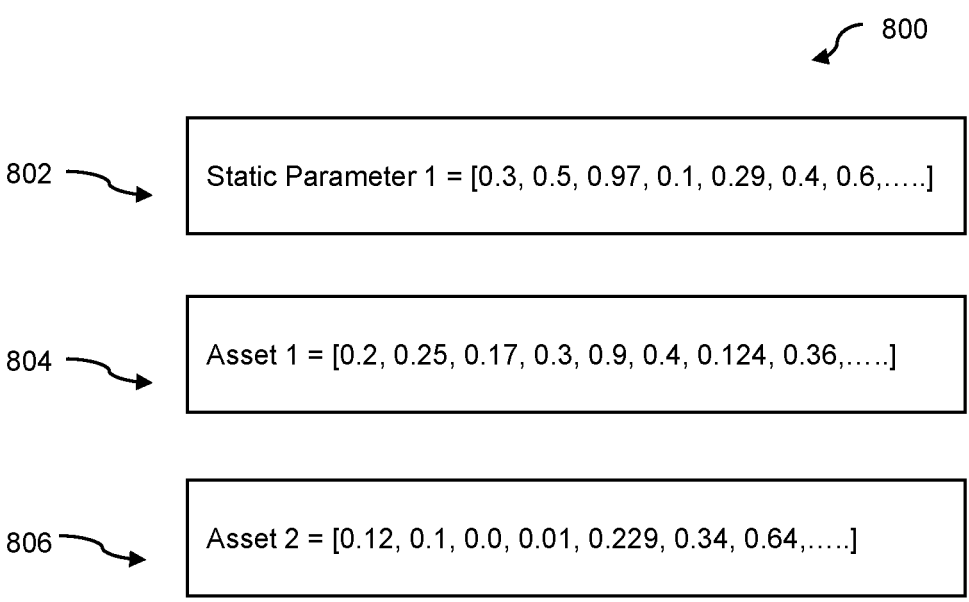
FIG. 8 illustrates a schematic diagram showing an exemplary sequential representation of one or more exemplary first vectors in accordance with one or more example embodiments described herein.

FIG. 8 illustrates a schematic diagram showing an exemplary sequential representation of one or more exemplary first vectors in accordance with one or more example embodiments described herein. In some example embodiments, one or more first vectors 802-806 (collectively "first vectors 800") described herein may be associated with the exemplary hierarchical representation as described in FIG. 5A of the current disclosure. In some example embodiments, natural language processing component 604 is configured to process one or more exemplary sequential representations (for example, 702-708) for each of the one or more assets and/or static parameters to generate one or more first vectors 802-806. For example, first vector 802 comprises one or more values indicative of numerical form of exemplary sequential representation 702 for static parameter 1 (5002). In another example, first vector 804 can comprise one or more values indicative of numerical form that is generated based at least in part on the exemplary sequential representation 702 for Asset 1 (5014) and first vector 802 generated for static parameter 1 (5002). In some example embodiments, the first vector 806 can be generated for Asset 2 (5016) as well. In some example embodiments, a length of the first vector can be pre-defined. Further, in some example embodiments, a first vector can be determined for a facility based on the one or more first vectors 802-806.

Figure 9:
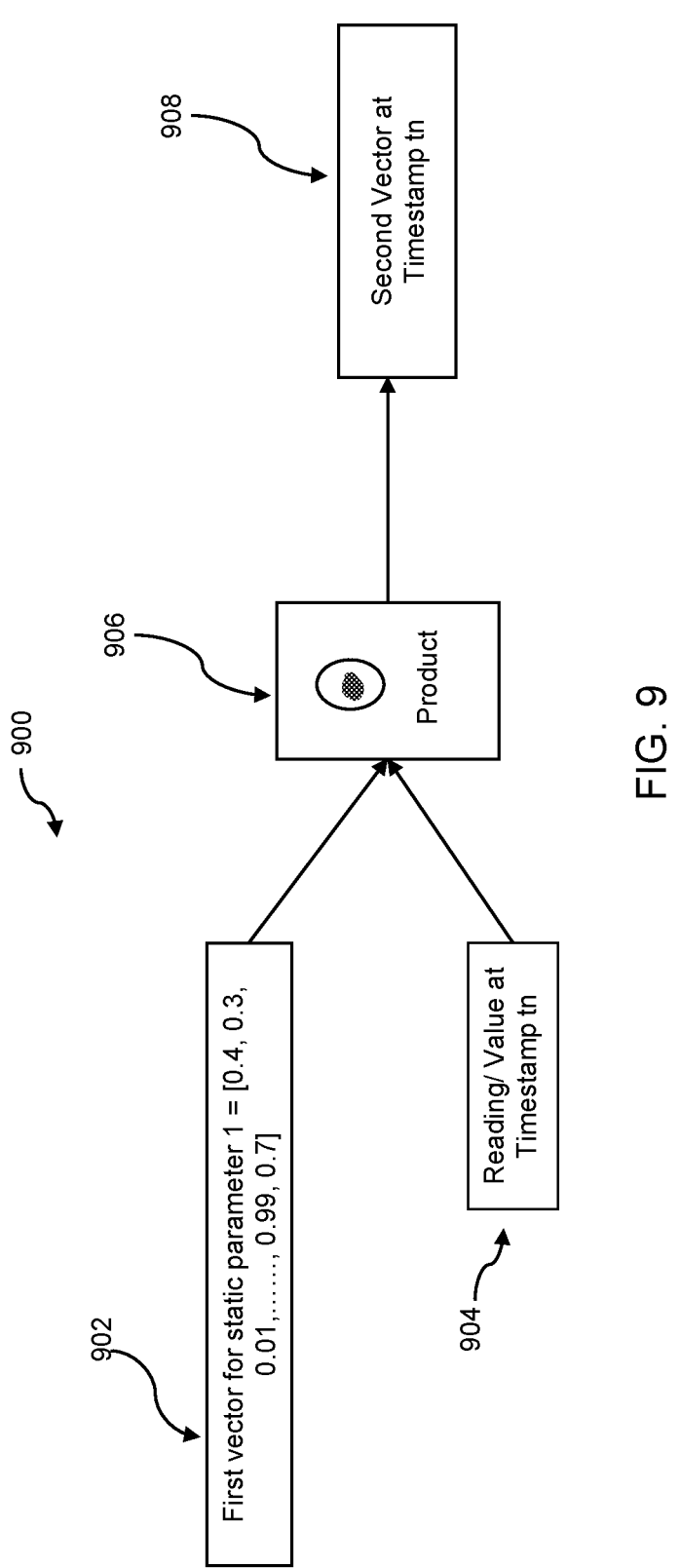
FIG. 9 illustrates a schematic diagram showing an example of determination of an exemplary second vector in accordance with one or more example embodiments described herein.

FIG. 9 illustrates a schematic diagram showing an example of determination of an exemplary second vector in accordance with one or more example embodiments described herein. In some example embodiments, data processing component 602 is configured to generate second vector 908 based at least in part on the one or more first vectors 802-806. Further, in some example embodiments, the data processing component 602 can receive telemetry data from one or more assets at a plurality of timestamps. In some example embodiments, the data processing component 602 can utilize first vector 902 that is determined for static parameter 1 (5002) and telemetry data to determine a second vector for static parameter 1 (5002) at a plurality of timestamps. Said differently, in some example embodiments, the data processing component 602 can utilize the first vector 902 and telemetry data at a particular timestamp to determine a second vector 908 at the particular timestamp. For example, if the static parameter 1 (5002) corresponds to temperature and is associated with a temperature sensor, then the first vector 902 for static parameter 1 (5002) i.e., for temperature is taken into account. Further, a reading or a measurement received from temperature sensor at timestamp tn 904 is considered to generate a second vector 908 for static parameter 1 (5002) i.e., for temperature at timestamp tn. In this regard, in some example embodiments, the data processing component 602 performs a product 906 of the first vector 902 with the reading or measurement received at timestamp tn 904. In some example embodiments, the product 906 corresponds to dot product. In some other example embodiments, the product 906 corresponds to cross product. Similarly, the data processing component 602 in other example embodiments is configured to generate one or more second vectors for static parameters and/or assets at different timestamps based on readings or telemetry data as described in block diagram 900.

Figure 10:
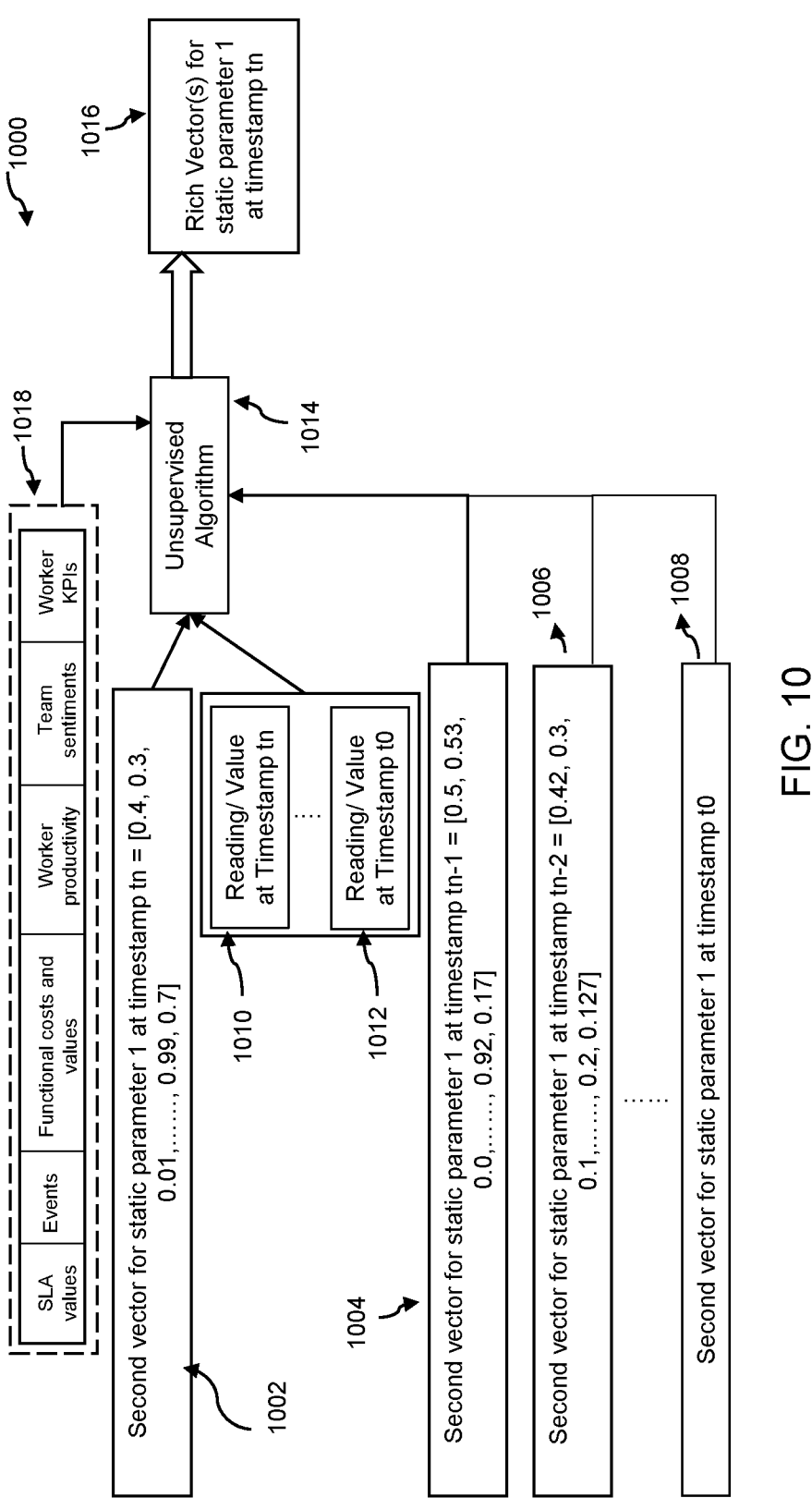
FIG. 10 illustrates a schematic diagram showing an example of determination of an exemplary rich vector in accordance with one or more example embodiments described herein.

FIG. 10 illustrates a schematic diagram showing an example of determination of an exemplary rich vector in accordance with one or more example embodiments described herein. In some example embodiments, the data processing component 602 and/or unsupervised algorithm 1016 is configured to generate rich vector 1016 for each of one or more static parameters. In some example embodiments, the unsupervised algorithm 1014 may be same as that of unsupervised algorithm 606 as described in FIG. 6 of the current disclosure. In some example embodiments, the data processing component 602 and/or unsupervised algorithm 1014 is configured to generate rich vector 1016 for a particular timestamp. In this regard, in some example embodiments, the data processing component 602 and/or unsupervised algorithm 1014 is configured to generate one or more rich vectors at a plurality of timestamps. In some example embodiments, one or more rich vectors are generated based at least in part on the telemetry data 1010-1012 and one or more second vectors 1002-1008. In some example embodiments, data processing component 602 generates one or more second vectors 1002-1008 for one of the one or more static parameters for example, static parameter 1 (5002). In some example embodiments, data processing component 602 generates one or more second vectors 1002-1008 based on block diagram 900 as described in FIG. 9 of the current disclosure. Further, in this regard, in some example embodiments, the one or more second vectors 1002-1008 may be generated at one or more timestamps. That is, in some example embodiments, second vector 1002 may be generated based on a reading or measurement received from an asset at timestamp tn. Further, in some example embodiments, second vector 1004 may be generated based on a reading or measurement received from an asset at timestamp tn-1. Similarly, second vectors 1006 and 1008 may be generated based on a reading or measurement received from an asset at timestamps tn-2 and t0, respectively.

In some example embodiments, the one or more second vectors 1002-1008 may be transmitted to unsupervised algorithm 1014. In some example embodiments, unsupervised algorithm 1014 can process the one or more second vectors 1002-1008 to generate a rich vector 1016 for a static parameter at a corresponding timestamp. In some example embodiments, the unsupervised algorithm 1014 may also utilize telemetry data 1010-1012 to generate rich vector 1016 for a static parameter at a corresponding timestamp. In some example embodiments, the unsupervised algorithm 1014 may utilize historical second vectors and/or telemetry data to generate rich vector 1016 for a static parameter at a corresponding timestamp. Further, in some example embodiments, unsupervised algorithm 1014 may generate a weight matrix for rich vector 1016 based on the one or more second vectors 1002-1008. In some example embodiments, the weight matrix may be used by the unsupervised algorithm 1014 as a feedback to further train the unsupervised algorithm 1014. Further, in some example embodiments, block diagram 1000 is configured to generate one or more rich vectors may also comprise an optional block 1018. In some example embodiments, the block 1018 may comprise one or more factors such as service level agreement (SLA) values, one or more events in a facility, one or more functional costs and values, worker productivity, team sentiments, and/or Key Performance Indicators (KPIs) associated with one or more workers. In some example embodiments, the unsupervised algorithm 1014 uses the one or more factors to assess an impact on one or more assets and/or operations in the facility. In some example embodiments, the unsupervised algorithm 1014 may utilize one or more second vectors 1002-1008 to generate a rich vector for an asset as well.

Figure 11:
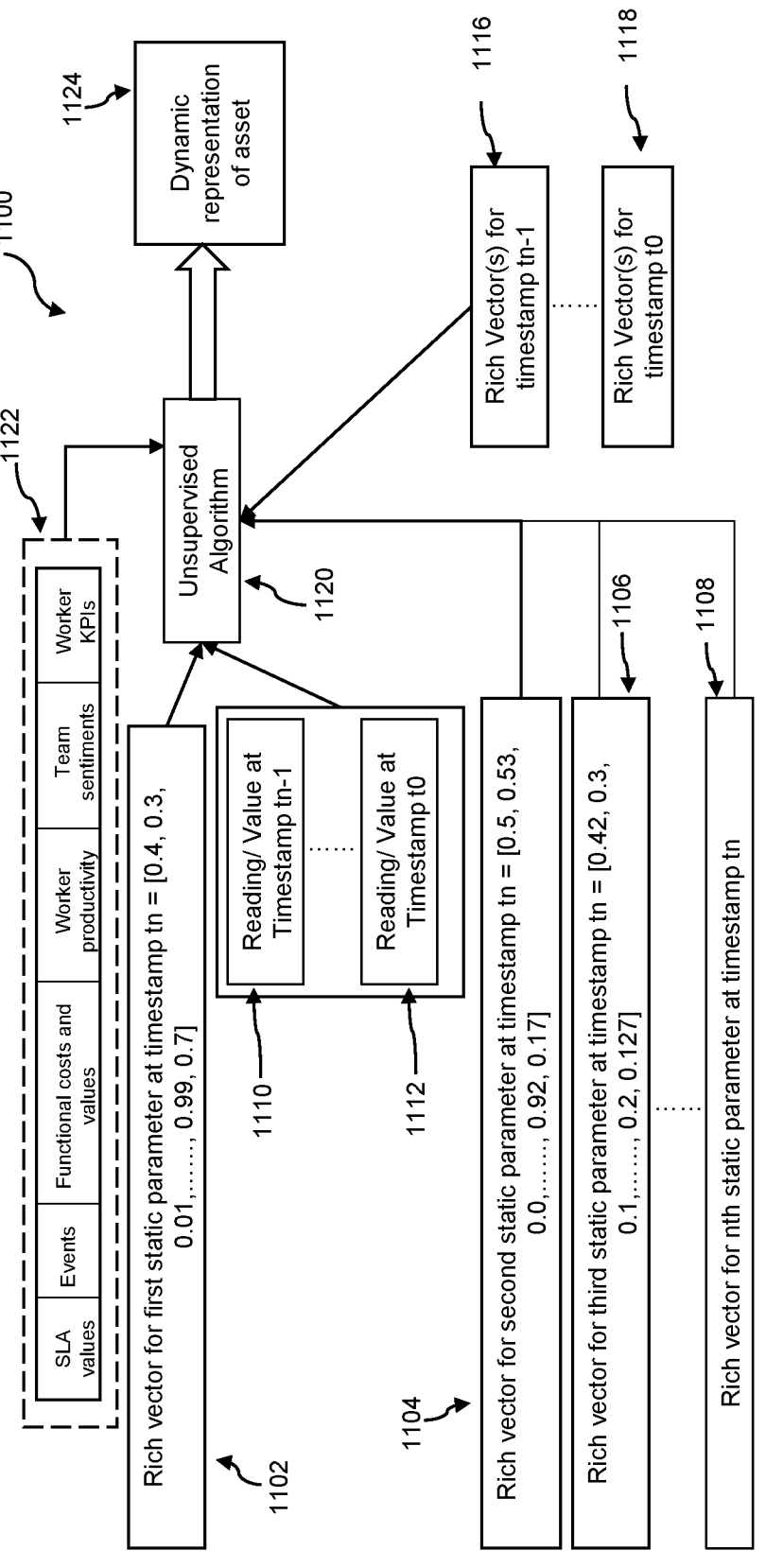
FIG. 11 illustrates a schematic diagram showing an example of determination of an exemplary dynamic representation for one or more assets in accordance with one or more example embodiments described herein.

FIG. 11 illustrates a schematic diagram showing an example of determination of an exemplary dynamic representation for one or more assets in accordance with one or more example embodiments described herein. In some example embodiments, the data processing component 602 and/or unsupervised algorithm 1116 is configured to generate a dynamic representation for an asset of one or more assets in a facility. In some example embodiments, the unsupervised algorithm 1116 may be same as that of unsupervised algorithm 606 as described in FIG. 6 and unsupervised algorithm 1014 as described in FIG. 10 of the current disclosure. In some example embodiments, the data processing component 602 and/or unsupervised algorithm 1014 is configured to generate a dynamic representation 1124 for an asset in the facility. In this regard, in some example embodiments, data processing component 602 generates one or more rich vectors 1102-1108 for one or more static parameters associated with an asset. In some example embodiments, the one or more rich vectors 1102-1108 may be generated based on block diagram 1000 as described in FIG. 10 of the current disclosure. In some example embodiments, if an asset is associated with "n" static parameters, then "n" rich vectors may be generated. Said differently, in some example embodiments, a rich vector can be generated for a static parameter for an asset. In this regard, in some example embodiments, one or more rich vectors 1102-1108 are generated for "n" static parameters. For example, if an asset is a motor, then one or more static parameters associated with the motor can be speed, current, and voltage. Further, in some example embodiments, speed, current, and voltage may correspond to first static parameter, second static parameter, and third static parameter, respectively for the motor. Accordingly, in some example embodiments, the data processing component 602 may be configured to generate rich vectors 1102, 1104, and 1106 for first static parameter (speed in this example), second static parameter (current in this example), and third static parameter (voltage in this example), respectively. Further, in some example embodiments, the data processing component 602 may be configured to generate one or more rich vectors 1102-1108 at a particular timestamp "tn" at which telemetry data is received from the asset. For example, for a current value/reading received from the motor at timestamp t1, a rich vector at timestamp t1 is generated based at least in part on the current value/reading received at timestamp t1.

In some example embodiments, the one or more rich vectors 1102-1108 may be transmitted to unsupervised algorithm 1120. In some example embodiments, unsupervised algorithm 1120 can process the one or more rich vectors 1102-1108 to generate a dynamic representation 1124 for an asset. In some example embodiments, the one or more rich vectors 1102-1108 may be generated at a timestamp tn. In some example embodiments, the unsupervised algorithm 1120 may also utilize telemetry data 1110-1112 to generate dynamic representation 1124. In some example embodiments, the unsupervised algorithm 1124 may utilize historical rich vectors 1116-1118 and/or historical telemetry data 1110-1112 to generate dynamic representation 1124. That is, in some example embodiments, one or more historical rich vectors 1116-1118 may correspond to rich vectors that are computed at a timestamp other than timestamp tn. For example, the timestamps may correspond to timestamps (tn-1)-t0. Further, in some example embodiments, at least one of the one or more historical rich vectors 1116-1118 may be considered by the unsupervised algorithm 1124 to generate the dynamic representation 1124 for the asset. Said differently, for example, if an asset has two static parameters, that is a first static parameter and a second static parameter, then the unsupervised algorithm 1124 may consider historical rich vectors for first static parameter only to generate a dynamic representation for the asset. Similarly, in some example embodiments, the unsupervised algorithm 1124 may consider at least one of the one or more historical telemetry data 1110-1112 to generate the dynamic representation 1124 for the asset. For example, in some example embodiments, if an asset has two static parameters, that is a first static parameter and a second static parameter, then the unsupervised algorithm 1124 may consider historical telemetry data for first static parameter only to generate a dynamic representation for the asset.

Further, in some example embodiments, block diagram 1100 is configured to generate dynamic representation for an asset may also comprise an optional block 1122. In some example embodiments, the block 1122 may comprise one or more factors such as service level agreement (SLA) values, one or more events in a facility, one or more functional costs and values, worker productivity, team sentiments, and/or performance Key Performance Indicators (KPIs) associated with one or more workers. In some example embodiments, the unsupervised algorithm 1124 uses the one or more factors to assess an impact on one or more assets and/or operations in the facility. In some example embodiments, the unsupervised algorithm 1124 may generate a dynamic representation 1124 for an asset in the facility using the one or more factors in the block 1122. In this regard, dynamic representation 1124 may be used to predict a maintenance requirement for the asset. In some other example embodiments, dynamic representation 1124 may be used to predict at least one of: a remaining useful life of the asset, a fault level in the asset, an obsolescence associated with the asset, an unavailability of one or more spare parts of the asset, an impact on Service Level Agreements (SLAs) associated with the asset, and an impact on client commitments for the asset. Also, in some example embodiments, the dynamic representation 1124 for an asset may be used to predict a maintenance requirement for another asset in the facility. In some other example embodiments, dynamic representation 1124 may be used to predict at least one of: a remaining useful life of another asset, a fault level in another asset, an obsolescence associated with another asset, an unavailability of one or more spare parts of another asset, an impact on Service Level Agreements (SLAs) associated with another asset, and an impact on client commitments for another asset in the facility. In this regard, in some example embodiments, the asset can be first asset and another asset can be second asset in the facility. Further, in some example embodiments, the dynamic representation 1124 for an asset may be used in conjunction with one or more second vectors and/or rich vectors associated with another asset in the facility to generate dynamic representation for another asset. Further, in some example embodiments, the dynamic representation 1124 for an asset may be used to generate a dynamic representation for a hierarchy of assets in the facility. In some example embodiments, a dynamic representation for one of a hierarchy of assets may be used to predict maintenance requirement for another hierarchy of assets in the facility. For example, a dynamic representation generated for one or more assets under freezer pick 5206 may be used to predict maintenance requirement for a conveyor (example Conveyor C 5208*b*) under cooler pick 5208. Also, in some example embodiments, the dynamic representation 1124 for an asset may be used to generate a dynamic representation for an entire facility as well. In some example embodiments, the dynamic representation 1124 may be updated dynamically in near real time based in response to receiving telemetry data in near real time. Further, in some example embodiments, dynamic representation of the facility may also be used to detect a maintenance requirement for any asset in the facility.

Figure 12A:
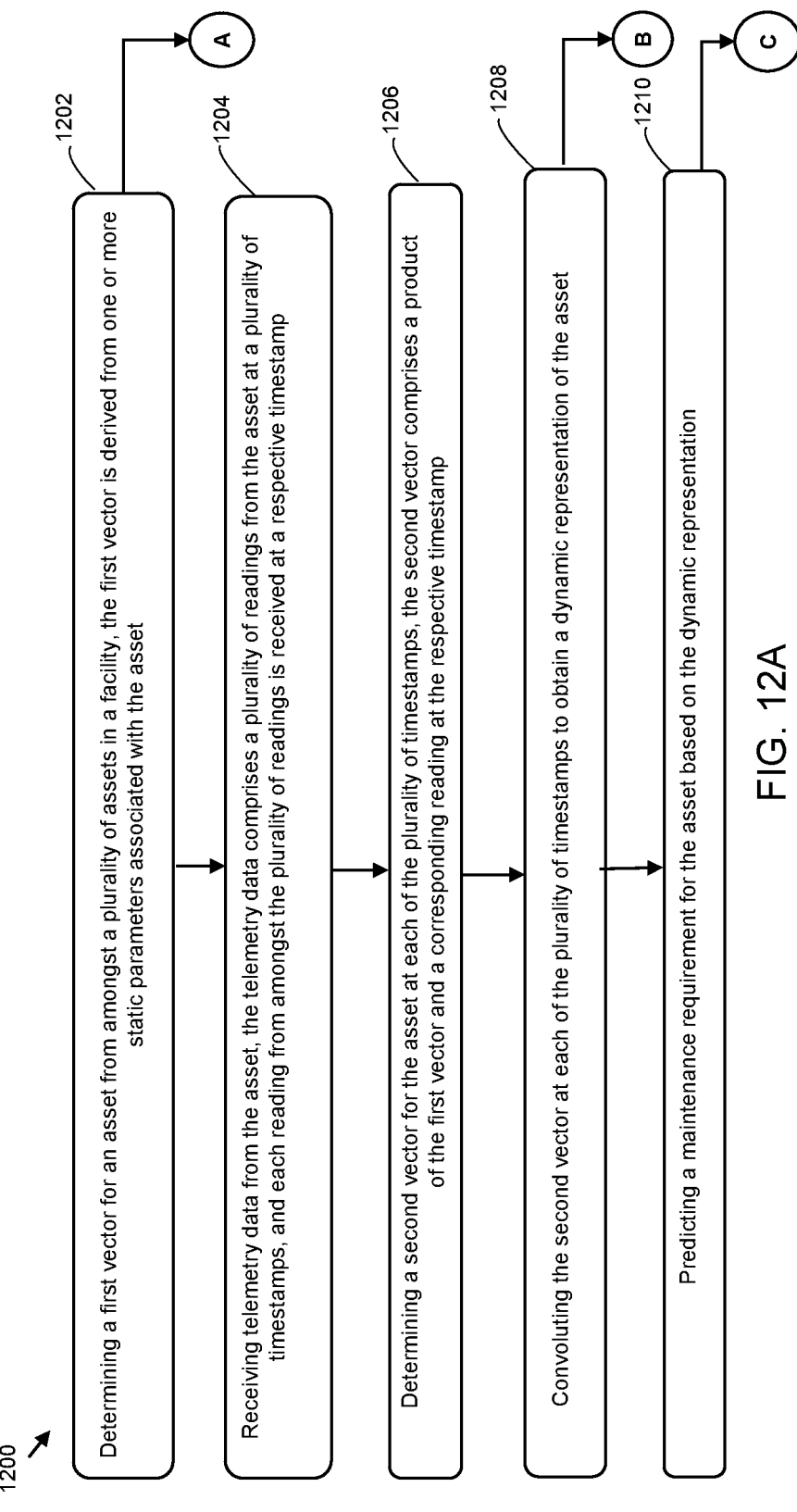
FIG. 12A illustrates a flowchart showing a method described in accordance with some example embodiments described herein.

FIG. 12A illustrates a flowchart showing a method described in accordance with some example embodiments described herein. At step 1202, the facility management system 600 includes means, such as data processing component 602 to determine a first vector for an asset from amongst a plurality of assets in a facility. In some example embodiments, the first vector is derived from one or more static parameters associated with the asset in the facility.

At step 1204, the facility management system 600 includes means, such as data processing component 602 to receive telemetry data from the asset. In some example embodiments, the telemetry data comprises a plurality of readings from the asset at a plurality of timestamps. In some example embodiments, each reading from amongst the plurality of readings is received at a respective timestamp from the asset in the facility.

At step 1206, the facility management system 600 includes means, such as data processing component 602 to determine a second vector for the asset at each of the plurality of timestamps. In some example embodiments, the second vector comprises a product of the first vector and a corresponding reading at the respective timestamp At step 1208, the facility management system 600 includes means, such as unsupervised algorithm 606 to convolute the second vector at each of the plurality of timestamps to obtain a dynamic representation of the asset.

At step 1210, the facility management system 600 includes means, such as unsupervised algorithm 606 to predict a maintenance requirement for the asset based on the dynamic representation.

FIG. 12B illustrates a flowchart showing a method described in accordance with some example embodiments described herein. In some example embodiments, in addition to the steps described in FIG. 12A of the current disclosure, FIG. 12B can comprise step 1206*a*. At step 1206*a*, the facility management system 600 includes means, such as data processing component 602 to concatenate the second vector with at least one of: one or more events and Service Level Agreements (SLAs) associated with the asset in the facility.

FIG. 13 illustrates a flowchart showing a method described in accordance with some example embodiments described herein. At step 1302, the facility management system 600 includes means, such as data processing component 602 to identify a hierarchical representation of the asset in the facility. In some example embodiments, the hierarchical representation comprises the one or more static parameters associated with the asset. Further, in some example embodiments, the one or more static parameters comprises: a location of the asset in the facility, a category to which the asset belongs in the facility, and/or one or more parameters measured by the asset in the facility.

At step 1304, the facility management system 600 includes means, such as data processing component 602 to convert the hierarchical representation into one or more sequential representations. In some example embodiments, each of the one or more sequential representations comprise a relation of each of the one or more parameters with the location and the category of the asset.

At step 1306, the facility management system 600 includes means, such as natural language processing component 604 to convert each of the one or more sequential representations into a vector. In some example embodiments, the vector comprises the one or more static parameters represented as one or more values.

Figure 14:
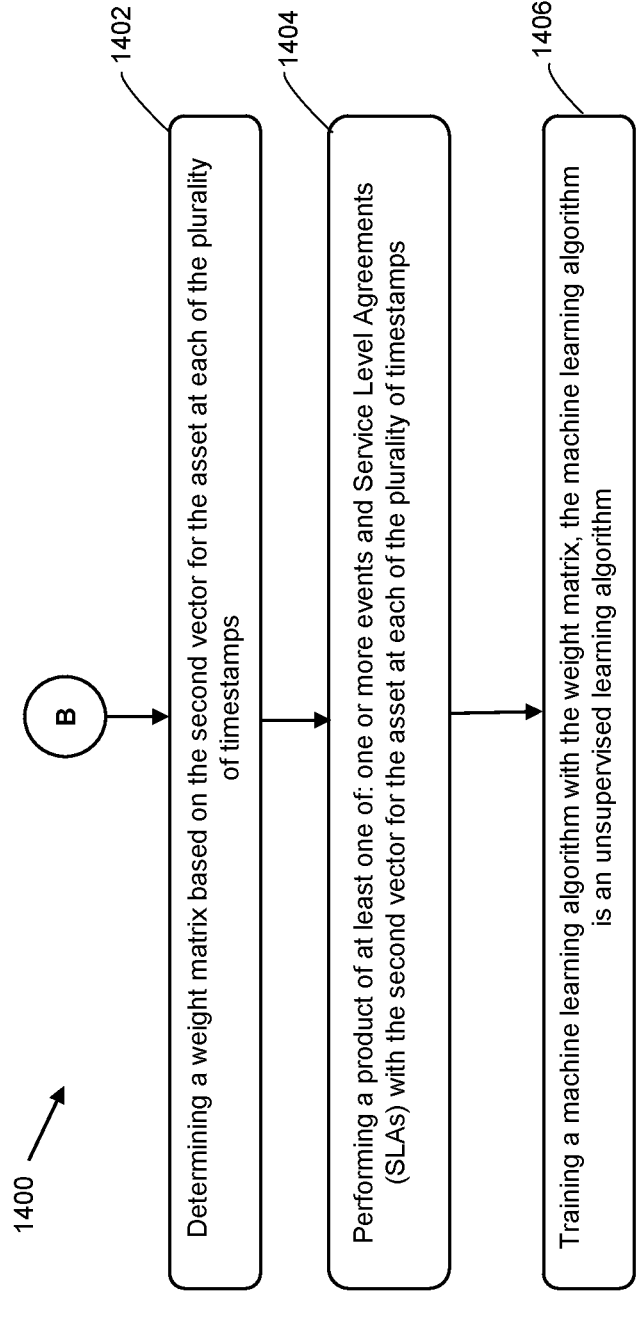
FIG. 14 illustrates a flowchart showing a method described in accordance with some example embodiments described herein.

FIG. 14 illustrates a flowchart showing a method described in accordance with some example embodiments described herein. At step 1402, the facility management system 600 includes means, such as unsupervised algorithm 606 to determine a weight matrix based on the second vector for the asset at each of the plurality of timestamps. At step 1404, the facility management system 600 includes means, such as unsupervised algorithm 606 to perform a product of at least one of: one or more events and Service Level Agreements (SLAs) with the second vector for the asset at each of the plurality of timestamps in order to determine a weight matrix. At step 1406, the facility management system 600 includes means, such as unsupervised algorithm 606 to train a machine learning algorithm with the weight matrix, wherein the machine learning algorithm is an unsupervised learning algorithm.

Figure 15:
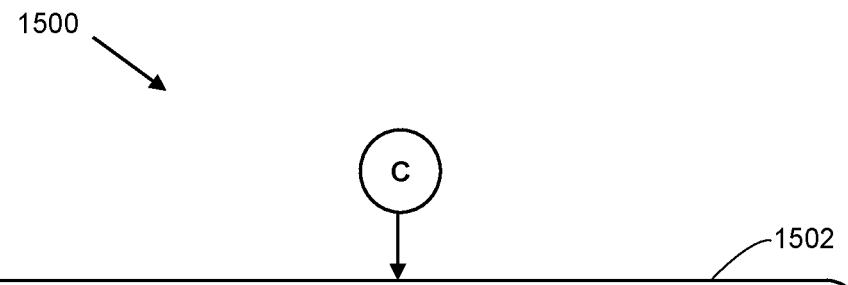
FIG. 15 illustrates a flowchart showing a method described in accordance with some example embodiments described herein.

FIG. 15 illustrates a flowchart showing a method described in accordance with some example embodiments described herein. At step 1502, the facility management system 600 includes means, such as unsupervised algorithm 606 to predict at least one of: a remaining useful life of the asset, a fault level in the asset, an obsolescence associated with the asset, an unavailability of one or more spare parts of the asset, an impact on Service Level Agreements (SLAs) associated with the asset, and an impact on client commitments.

Figure 16:
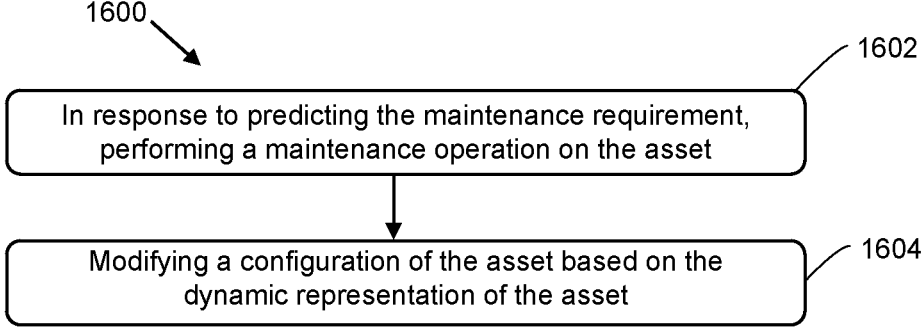
FIG. 16 illustrates a flowchart showing a method described in accordance with some example embodiments described herein.

FIG. 16 illustrates a flowchart showing a method described in accordance with some example embodiments described herein. At step 1602, the facility management system 600 includes means, such as data processing component 602 to perform a maintenance operation on the asset in response to predicting the maintenance requirement by the unsupervised algorithm 606. At step 1604, the facility management system 600 includes means, such as data processing component 602 to modify a configuration of the asset based on the dynamic representation of the asset.

Figure 17:
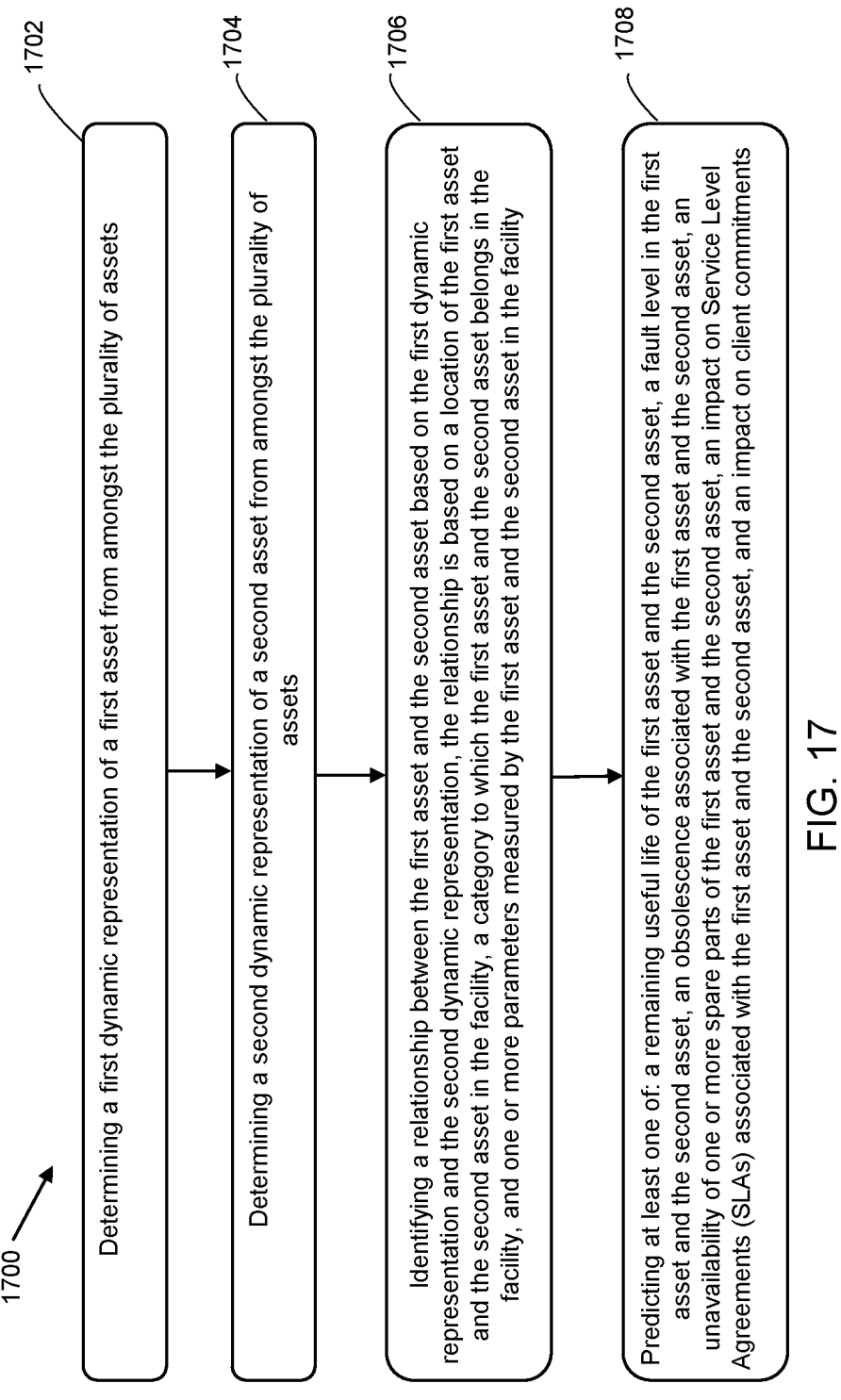
FIG. 17 illustrates a flowchart showing a method described in accordance with some example embodiments described herein.

FIG. 17 illustrates a flowchart showing a method described in accordance with some example embodiments described herein. At step 1702, the facility management system 600 includes means, such as unsupervised algorithm 606 to determine a first dynamic representation of a first asset from amongst the plurality of assets. At step 1704, the facility management system 600 includes means, such as unsupervised algorithm 606 to determine a second dynamic representation of a second asset from amongst the plurality of assets.

At step 1706, the facility management system 600 includes means, such as unsupervised algorithm 606 to identify a relationship between the first asset and the second asset based on the first dynamic representation and the second dynamic representation. In some example embodiments, the relationship is based on a location of the first asset and the second asset in the facility, a category to which the first asset and the second asset belongs in the facility, and one or more parameters measured by the first asset and the second asset in the facility.

At step 1708, the facility management system 600 includes means, such as unsupervised algorithm 606 to predict at least one of: a remaining useful life of the first asset and the second asset, a fault level in the first asset and the second asset, an obsolescence associated with the first asset and the second asset, an unavailability of one or more spare parts of the first asset and the second asset, an impact on Service Level Agreements (SLAs) associated with the first asset and the second asset, and an impact on client commitments.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A method comprising:

determining, by one or more processors, a first vector for an asset from amongst a plurality of assets in a facility, wherein the first vector is derived from one or more static parameters associated with the asset, wherein determining the first vector for the asset comprises:

identifying a hierarchical representation of the asset in the facility, wherein the hierarchical representation comprises the one or more static parameters associated with the asset, and wherein the one or more static parameters comprises: a location of the asset in the facility, a category to which the asset belongs in the facility, and one or more parameters measured by the asset in the facility;

converting the hierarchical representation into one or more sequential representations, each of the one or more sequential representations comprise a relation of each of the one or more parameters with the location and the category of the asset; and converting each of the one or more sequential representations into a vector using a natural language processing (NLP) algorithm, wherein the vector comprises the one or more static parameters represented as one or more values;

receiving telemetry data from the asset, wherein the telemetry data comprises a plurality of readings from the asset at a plurality of timestamps, and wherein each reading from amongst the plurality of readings is received at a respective timestamp;

determining by the one or more processors, a second vector for the asset at each of the plurality of timestamps, wherein the second vector comprises a product of the first vector and a corresponding reading at the respective timestamp;

convoluting by a machine learning algorithm, the second vector at each of the plurality of timestamps to obtain a dynamic representation of the asset, wherein the convolution of the second vector comprises:

determining a weight matrix based on the second vector for the asset at each of the plurality of timestamps; and training the machine learning algorithm with the weight matrix; and predicting by the machine learning algorithm, a maintenance requirement for the asset based on the dynamic representation.

2. The method of claim 1, further comprising:

concatenating the second vector with at least one of: one or more events and Service Level Agreements (SLAs) associated with the asset.

3. The method of claim 1, wherein the machine learning algorithm is an unsupervised learning algorithm.

4. The method of claim 3, wherein determining the weight matrix comprises:

performing a product of at least one of: one or more events and Service Level Agreements (SLAs) with the second vector for the asset at each of the plurality of timestamps.

5. The method of claim 1, wherein predicting a maintenance requirement for the asset based on the dynamic representation comprises:

predicting at least one of: a remaining useful life of the asset, a fault level in the asset, an obsolescence associated with the asset, an unavailability of one or more spare parts of the asset, an impact on Service Level Agreements (SLAs) associated with the asset, and an impact on client commitments.

6. The method of claim 1, further comprising:

in response to predicting the maintenance requirement, performing a maintenance operation on the asset; and modifying a configuration of the asset based on the dynamic representation of the asset.

7. The method of claim 1, further comprising:

determining a first dynamic representation of a first asset from amongst the plurality of assets;

determining a second dynamic representation of a second asset from amongst the plurality of assets;

identifying a relationship between the first asset and the second asset based on the first dynamic representation and the second dynamic representation, wherein the relationship is based on a location of the first asset and the second asset in the facility, a category to which the first asset and the second asset belongs in the facility, and one or more parameters measured by the first asset and the second asset in the facility; and predicting at least one of: a remaining useful life of the first asset and the second asset, a fault level in the first asset and the second asset, an obsolescence associated with the first asset and the second asset, an unavailability of one or more spare parts of the first asset and the second asset, an impact on Service Level Agreements (SLAs) associated with the first asset and the second asset, and an impact on client commitments.

8. A system comprising:

a processor; and a memory communicatively coupled to the processor, wherein the memory comprises one or more instructions which when executed by the processor cause the processor to:

determine a first vector for an asset from amongst a plurality of assets in a facility, wherein the first vector is derived from one or more static parameters associated with the asset, and wherein to determine the first vector for the asset, the processor is configured to:

identify a hierarchical representation of the asset in the facility, wherein the hierarchical representation comprises the one or more static parameters associated with the asset, and wherein the one or more static parameters comprises: a location of the asset in the facility, a category to which the asset belongs in the facility, and one or more parameters measured by the asset in the facility;

convert the hierarchical representation into one or more sequential representations, each of the one or more sequential representations comprise a relation of each of the one or more parameters with the location and the category of the asset; and convert each of the one or more sequential representations into a vector using a natural language processing (NLP) algorithm, wherein the vector comprises the one or more static parameters represented as one or more values;

receive telemetry data from the asset, wherein the telemetry data comprises a plurality of readings from the asset at a plurality of timestamps, and wherein each reading from amongst the plurality of readings is received at a respective timestamp;

determine a second vector for the asset at each of the plurality of timestamps, wherein the second vector comprises a product of the first vector and a corresponding reading at the respective timestamp;

convolute the second vector at each of the plurality of timestamps with a machine learning algorithm to obtain a dynamic representation of the asset, wherein the convolution of the second vector comprises:

determining a weight matrix based on the second vector for the asset at each of the plurality of timestamps; and training the machine learning model with the weight matrix; and predict by the machine learning algorithm, a maintenance requirement for the asset based on the dynamic representation.

9. The system of claim 8, wherein the processor is further configured to:

concatenate the second vector with at least one of: one or more events and Service Level Agreements (SLAs) associated with the asset.

10. The system of claim 8, wherein the machine learning algorithm is an unsupervised learning algorithm.

11. The system of claim 10, wherein the processor is further configured to:

perform a product of at least one of: one or more events and Service Level Agreements (SLAs) with the second vector for the asset at each of the plurality of timestamps.

12. The system of claim 8, wherein the processor is further configured to:

predict at least one of: a remaining useful life of the asset, a fault level in the asset, an obsolescence associated with the asset, an unavailability of one or more spare parts of the asset, an impact on Service Level Agreements (SLAs) associated with the asset, and an impact on client commitments;

perform a maintenance operation on the asset in response to predicting the maintenance requirement; and modify a configuration of the asset based on the dynamic representation of the asset.

13. A non-transitory, computer-readable storage medium having program instructions embodied thereon, the program instructions executable by a processor to cause the processor to:

determine a first vector for an asset from amongst a plurality of assets in a facility, wherein the first vector is derived from one or more static parameters associated with the asset, and wherein to determine the first vector for the asset, the processor is configured to:

identify a hierarchical representation of the asset in the facility, wherein the hierarchical representation comprises the one or more static parameters associated with the asset, and wherein the one or more static parameters comprises: a location of the asset in the facility, a category to which the asset belongs in the facility, and one or more parameters measured by the asset in the facility;

convert the hierarchical representation into one or more sequential representations, each of the one or more sequential representations comprise a relation of each of the one or more parameters with the location and the category of the asset; and convert each of the one or more sequential representations into a vector using a natural language processing (NLP) algorithm, wherein the vector comprises the one or more static parameters represented as one or more values;

receive telemetry data from the asset, wherein the telemetry data comprises a plurality of readings from the asset at a plurality of timestamps, and wherein each reading from amongst the plurality of readings is received at a respective timestamp;

determine a second vector for the asset at each of the plurality of timestamps, wherein the second vector comprises a product of the first vector and a corresponding reading at the respective timestamp;

convolute by a machine learning algorithm, the second vector at each of the plurality of timestamps with a machine learning algorithm to obtain a dynamic representation of the asset, wherein the convolution of the second vector comprises:

determining a weight matrix based on the second vector for the asset at each of the plurality of timestamps; and training a machine learning algorithm with the weight matrix; and predict by the machine learning algorithm, a maintenance requirement for the asset based on the dynamic representation.

14. The non-transitory, computer-readable storage medium of claim 13, wherein the processor is further configured to:

concatenate the second vector with at least one of: one or more events and Service Level Agreements (SLAs) associated with the asset.

15. The non-transitory, computer-readable storage medium of claim 13, wherein the machine learning algorithm is an unsupervised learning algorithm.

16. The non-transitory, computer-readable storage medium of claim 15, wherein the processor is further configured to:

perform a product of at least one of: one or more events and Service Level Agreements (SLAs) with the second vector for the asset at each of the plurality of timestamps.

\* \* \* \* \*